(12) United States Patent
Garduno Hernandez

(10) Patent No.: US 12,204,494 B2
(45) Date of Patent: Jan. 21, 2025

(54) IMPLEMENTING GRAPH SEARCH WITH IN-STRUCTURE METADATA OF A GRAPH-ORGANIZED FILE SYSTEM

(71) Applicant: Oracle International Corporation, Redwood Shores, CA (US)

(72) Inventor: Armando Antonio Garduno Hernandez, Zapopan (MX)

(73) Assignee: Oracle International Corporation, Redwood Shores, CA (US)

(*) Notice: Subject to any disclaimer, the term of this patent is extended or adjusted under 35 U.S.C. 154(b) by 142 days.

(21) Appl. No.: 17/719,555

(22) Filed: Apr. 13, 2022

(65) Prior Publication Data

US 2023/0334014 A1    Oct. 19, 2023

(51) Int. Cl.
*G06F 16/00*    (2019.01)
*G06F 16/13*    (2019.01)

(52) U.S. Cl.
CPC .................................. *G06F 16/13* (2019.01)

(58) Field of Classification Search
None
See application file for complete search history.

(56) References Cited

U.S. PATENT DOCUMENTS 9,053,167 B1* 6/2015 Swift ...................... G06F 16/27
2003/0217027 A1 11/2003 Farber et al.
2005/0262470 A1* 11/2005 Gavrilov ............. G06F 16/9024
  707/E17.011
2009/0303239 A1 12/2009 Ang et al.
2012/0113121 A1* 5/2012 Luo ........................ G06F 16/587
  345/440
2013/0067034 A1* 3/2013 Degioanni ............. H04L 43/04
  709/218

(Continued)

OTHER PUBLICATIONS

Current Claims, in International Application No. PCT/US2023/018563, dated Apr. 13, 2023, 4 pages.

(Continued)

*Primary Examiner* — Hasanul Mobin
(74) *Attorney, Agent, or Firm* — Hickman Becker Bingham Ledesma LLP

(57) ABSTRACT

Techniques are described herein for a graph-organized file system (GOFS) that represents a data graph using a plurality of gnode data structures and a plurality of edge entry data structures. Gnodes and edge entries both store one or more "in-structure" metadata values for graph component properties. A GOFS partition includes dedicated storage for "out-of-structure" graph component metadata values that are accessed using graph component identifiers. Search operations may use the in-structure and/or out-of-structure metadata values to efficiently identify graph search results. Search criteria may involve in-structure metadata values for both nodes and relationships. Accessing in-structure metadata values for a particular search operation may be performed using an index or from within the graph component data structures themselves. When the search criteria of a search operation involve out-of-structure metadata values, generating search operation results can be performed based on accessing dedicated metadata storage using component identifiers, or using an index.

19 Claims, 14 Drawing Sheets

(56) References Cited

U.S. PATENT DOCUMENTS

| | | | |
|---|---|---|---|
| 2013/0275396 A1* | 10/2013 | Condict | H03M 7/30 |
| | | | 707/693 |
| 2014/0122529 A1 | 5/2014 | Frieder et al. | |
| 2015/0220578 A1 | 8/2015 | Hunt et al. | |
| 2015/0261881 A1* | 9/2015 | Wensel | G06F 9/4494 |
| | | | 707/798 |
| 2015/0278397 A1 | 10/2015 | Hendrickson et al. | |
| 2016/0057503 A1* | 2/2016 | Venkataraman | H04N 21/47 |
| | | | 725/53 |
| 2017/0060924 A1* | 3/2017 | Fitzhardinge | H04L 67/1095 |
| 2017/0061032 A1 | 3/2017 | Fitzhardinge | |
| 2017/0091075 A1* | 3/2017 | Bhat | G06F 11/3688 |
| 2017/0221240 A1* | 8/2017 | Stetson | G06F 16/9024 |
| 2017/0262551 A1* | 9/2017 | Cho | G06F 16/27 |
| 2019/0057119 A1* | 2/2019 | Zizka | G06F 16/28 |
| 2019/0236093 A1* | 8/2019 | Andavarapu | G06F 16/432 |
| 2020/0221139 A1* | 7/2020 | Vosoughi | H04N 19/17 |
| 2021/0084388 A1* | 3/2021 | Kunsberg | H04N 21/440245 |
| 2021/0219000 A1* | 7/2021 | Zhang | H04N 19/184 |
| 2022/0414207 A1* | 12/2022 | Shimbo | G06F 21/552 |
| 2023/0138151 A1* | 5/2023 | Varley | G06F 16/338 |
| | | | 707/740 |

OTHER PUBLICATIONS

Ames, Sasha, et al., "QMDS: a File System Metadata Management Service Supporting a Graph Data Model-based Query Language", 2011 6th IEEE Intl Conf (NAS), Jul. 28, 2011, doi: 10.1109/NAS.2011.33, pp. 268-277, 10pgs.

Hernandez, U.S. Appl. No. 17/719,550, filed Apr. 13, 2022, Notice of Allowance and Fees Due.

Wikipedia, "User space and kernel space", Feb. 9, 2022, available: https://en.wikipedia.org/w/index.php?title=User_space_and_kernel_space&oldid=1070773582.

* cited by examiner

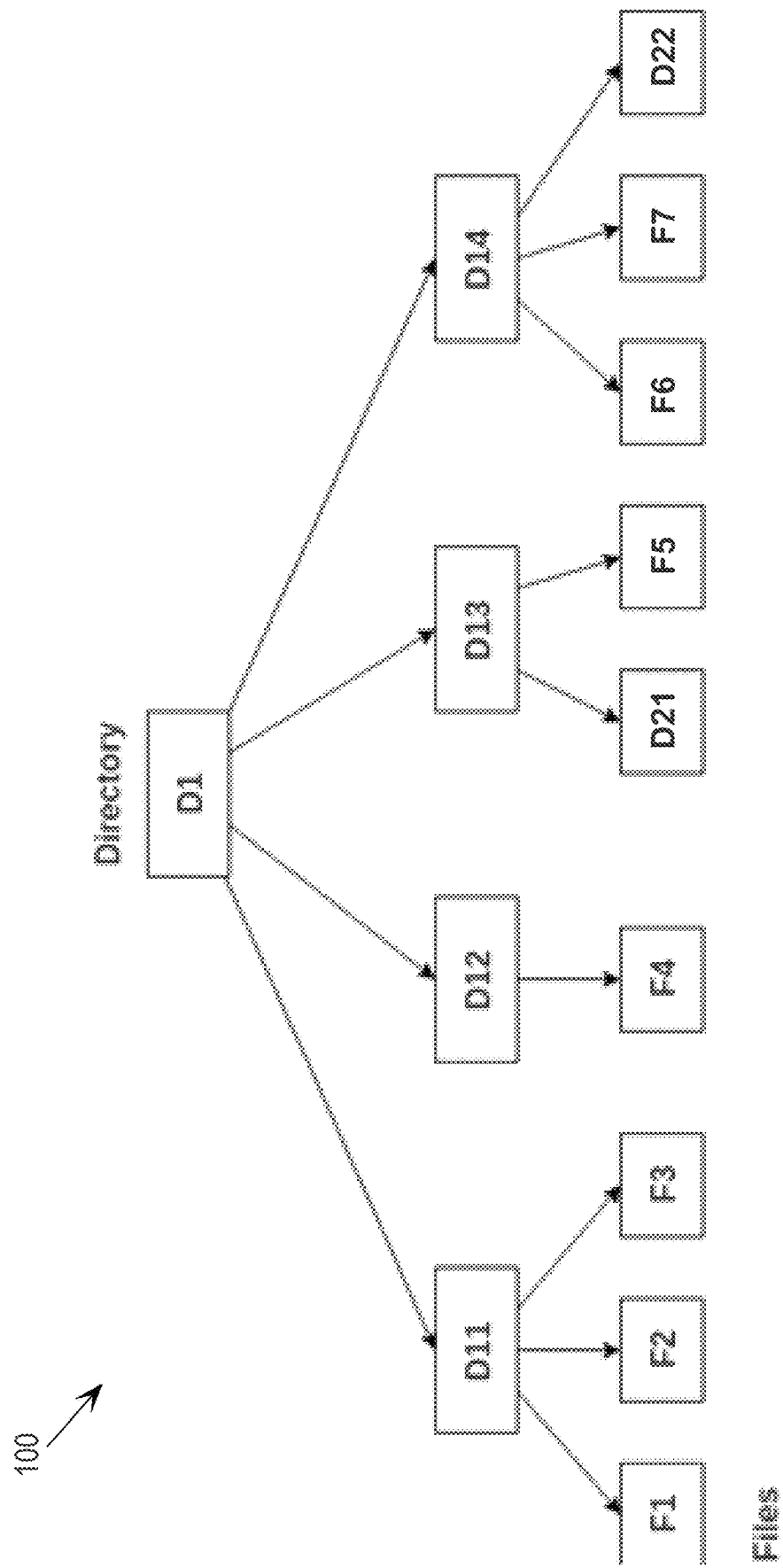

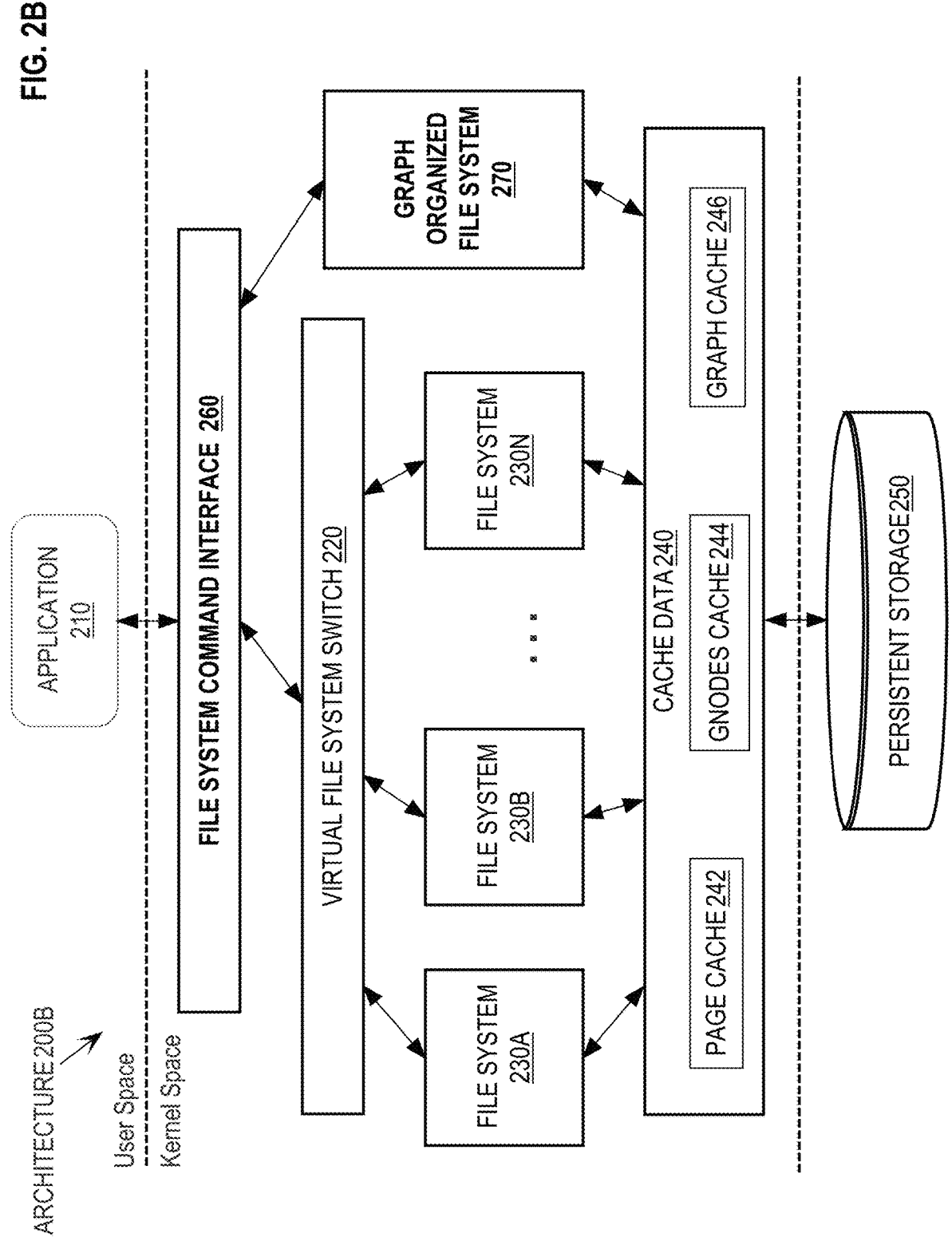

FIG. 6

| ID | GNODE TABLE 600 | | | | |
|---|---|---|---|---|---|
| V0 | NODE FIELDS 402<br>CONTENT FIELD 410<br>EDGE FIELD 420: | RELAT_ID | GNODE_NAME | GNODE_ID | METADATA |
| | | 512 | candidate.pdf | V1 | weight:111 |
| | | 516 | music.mod | V2 | weight:222 |
| | | 518 | image.png | V3 | weight:333 |
| | | 520 | video.mpeg | V4 | weight:444 |
| V1 | NODE FIELDS 402<br>CONTENT FIELD 410<br>EDGE FIELD 420: | RELAT_ID | GNODE_NAME | GNODE_ID | METADATA |
| | | 512 | document.doc | V0 | weight:111 |
| | | 522 | video.mpeg | V4 | weight:522 |
| | | 514 | music.mod | V2 | weight:7981 |
| V2 | NODE FIELDS 402<br>CONTENT FIELD 410<br>EDGE FIELD 420: | RELAT_ID | GNODE_NAME | GNODE_ID | METADATA |
| | | 516 | document.doc | V0 | weight:222 |
| | | 524 | image.png | V3 | weight:1125 |
| | | 514 | candidate.pdf | V1 | weight:12 |
| V3 | NODE FIELDS 402<br>CONTENT FIELD 410<br>EDGE FIELD 420: | RELAT_ID | GNODE_NAME | GNODE_ID | METADATA |
| | | 524 | music.mod | V2 | weight:1125 |
| | | 518 | document.doc | V0 | weight:333 |
| | | 526 | video.mpeg | V4 | weight:624 |
| V4 | NODE FIELDS 402<br>CONTENT FIELD 410<br>EDGE FIELD 420: | RELAT_ID | GNODE_NAME | GNODE_ID | METADATA |
| | | 520 | document.doc | V0 | weight:444 |
| | | 522 | candidate.pdf | V1 | weight:111 |
| | | 526 | image.png | V3 | weight:624 |

FIG. 7A

GNODE TABLE 700

| ID | | | | | |
|---|---|---|---|---|---|
| V0 | NODE FIELDS 402<br>CONTENT FIELD 410<br>EDGE FIELD 420: | | | | |
| | RELAT_ID | GNODE_NAME | GNODE_ID | METADATA | FLAGS |
| | 512 | candidate.pdf | V1 | weight:111 | OS_HIDDEN: FALSE |
| | 516 | music.mod | V2 | weight:222 | OS_HIDDEN: FALSE |
| | 518 | image.png | V3 | weight:333 | OS_HIDDEN: FALSE |
| | 520 | video.mpeg | V4 | weight:444 | OS_HIDDEN: FALSE |
| V1 | NODE FIELDS 402<br>CONTENT FIELD 410<br>EDGE FIELD 420: | | | | |
| | RELAT_ID | GNODE_NAME | GNODE_ID | METADATA | FLAGS |
| | 512 | document.doc | V0 | weight:111 | OS_HIDDEN: FALSE |
| | 522 | video.mpeg | V4 | weight:522 | OS_HIDDEN: FALSE |
| | 514 | music.mod | V2 | weight:7981 | OS_HIDDEN: FALSE |
| | 532 | gateway.doc | V5 | - | OS_HIDDEN: TRUE |
| V2 | NODE FIELDS 402<br>CONTENT FIELD 410<br>EDGE FIELD 420: | | | | |
| | RELAT_ID | GNODE_NAME | GNODE_ID | METADATA | FLAGS |
| | 516 | document.doc | V0 | weight:222 | OS_HIDDEN: FALSE |
| | 524 | image.png | V3 | weight:1125 | OS_HIDDEN: FALSE |
| | 514 | candidate.pdf | V1 | weight:12 | OS_HIDDEN: FALSE |

FIG. 7B

GNODE TABLE 700

| ID | | | | | |
|---|---|---|---|---|---|
| V3 | NODE FIELDS 402 CONTENT FIELD 410 EDGE FIELD 420: | | | | |
| | RELAT_ID | GNODE_NAME | GNODE_ID | METADATA | FLAGS |
| | 524 | music.mod | V2 | weight:1125 | OS_HIDDEN: FALSE |
| | 518 | document.doc | V0 | weight:333 | OS_HIDDEN: FALSE |
| | 526 | video.mpeg | V4 | weight:624 | OS_HIDDEN: FALSE |
| V4 | NODE FIELDS 402 CONTENT FIELD 410 EDGE FIELD 420: | | | | |
| | RELAT_ID | GNODE_NAME | GNODE_ID | METADATA | FLAGS |
| | 520 | document.doc | V0 | weight:444 | OS_HIDDEN: FALSE |
| | 522 | candidate.pdf | V1 | weight:111 | OS_HIDDEN: FALSE |
| | 526 | image.png | V3 | weight:624 | OS_HIDDEN: FALSE |
| V5 | NODE FIELDS 402 CONTENT FIELD 410 EDGE FIELD 420: | | | | |
| | RELAT_ID | GNODE_NAME | GNODE_ID | METADATA | FLAGS |
| | 532 | candidate.pdf | V1 | weight:177 | OS_HIDDEN: FALSE |

FIG. 8

DEFINE PROPERTIES FOR NODE/RELATIONSHIP   X

| NODES | RELATS |

DEFINED PROPERTY SETS:
- THESIS FORM [EDIT]
- RESEARCH - HOSPITAL [EDIT]
- RESEARCH - SURVEY [EDIT]

NEW PROPERTY SET

LABEL [THESIS VERSION]

PROPERTY NAME [VERSION NUMBER]  TYPE [INTEGER ▶]  IN-STRUCTURE? ■

PROPERTY NAME [SECTION]  TYPE [STRING ▶]  IN-STRUCTURE? ☐

PROPERTY NAME [FINAL]  TYPE [BOOLEAN ▶]  IN-STRUCTURE? ☐

PROPERTY NAME [REDLINE COMPLETED]  TYPE [BOOLEAN ▶]  IN-STRUCTURE? ☐

[SAVE]   [NEW]

800

IMPLEMENTING GRAPH SEARCH WITH IN-STRUCTURE METADATA OF A GRAPH-ORGANIZED FILE SYSTEM

RELATED APPLICATION DATA

This application is related to U.S. patent application Ser. No. 17/719,550 entitled "A GRAPH-ORGANIZED FILE SYSTEM", filed Apr. 13, 2022, the contents all of which are incorporated by reference in their entirety for all purposes as if fully set forth herein

FIELD OF THE INVENTION

The disclosed embodiments relate to file systems, and more particularly, to a graph file system, comprising content nodes and relationships between the nodes, implemented in a kernel space.

BACKGROUND

A file system defines (a) a data structure that an operating system of a computing device uses to store user data and (b) a user interface to access and manipulate the stored data. A file system generally organizes stored data into components, such as files and directories, which are arranged in a hierarchical data structure. A hierarchical data structure is defined by a root directory that acts as a mount point for the file system, where each directory in the hierarchy may store one or both of lower-level directories and/or files of any type, such as text, image, video, audio, etc. Generally, files and directories are associated with metadata (such as name, owner, last-edited timestamp, etc.), and may be relocated within the defined hierarchical data structure under the root directory.

A file system may be implemented by a single computing device, or may be implemented using multiple computing devices by creating a virtual file system that integrates the information from all of the devices into a single file system hierarchy. In such multi-node systems, there is one root directory, and every file existing on the multi-node file system is logically located under the root directory. Unix-like systems can use a RAM disk or network shared resource as the root directory of a multi-node file system.

To illustrate a hierarchical file system, FIG. 1 depicts a file system hierarchy 100 with a root directory D1 and second-level directories D11-D14 that are "located within" (or are immediate child nodes of) directory D1. File system hierarchy 100 further comprises third-level directories D21 and D22 and third-level files F1-F7, where files F1-F3 are located within directory D11, file F4 is located within directory D12, directory D21 and file F5 are located within directory D13, and files F6-F7 and directory D22 are located within directory D14. For example, a user that desires to access the data in file F4 may interact with hierarchy 100, via a user interface, to navigate from directory D1 to directory D12 that includes F4. The user then may gain access to the content of file F4 by instructing the operating system, via the user interface, to "open" file F4.

File systems with hierarchically-organized data structures have been the standard for operating systems for at least five decades. Since this convention was first established, the storage and processing capacity of computers have increased exponentially over time, which has allowed users to redefine how data is processed by computing devices.

Modern computer systems manage and process data with complex associations, such as social network data, neural network data, and geographical data. Because many complex sets of data do not fit neatly into hierarchical data structures, complex data management may be performed using naming schemes, directory structures, or data management software run by an operating system.

To illustrate, D1 of file system hierarchy 100 represents a particular project (such as a doctoral thesis), and each sub-directory D11-D14 represents a particular aspect of the project (such as D11: "drafts", D12: "research", D13: "figures", and D14: "forms"). Within each sub-directory, a user may store files or additional sub-directories that represent various information related to the topic of the higher-level directory. For example, files F1-F3 each represent a draft of the thesis. The filenames of these drafts may show relationships between the files, e.g., where each filename ends in a version number showing the progression of the draft, or each filename indicates a respective portion of the overall thesis document that is in the file.

However, it is easy for complex data management strategies involving naming and/or directory conventions to be ignored or confused. If the convention is not strictly adhered to, it can be difficult to identify relationships between the files. For example, a user generally identifies the progression of document drafts with version numbers appended to the end of file names, and then creates a final version that is labeled with the suffix "_FINAL". The user then receives feedback on this "final" draft, and produces a new draft version with the suffix "_FINAL_UPDATE". In time, it may be difficult to determine which of these "final" drafts is meant to be the finished draft of the document, notwithstanding the different timestamps that would be associated with the files.

As indicated above, data management software that is run by an operating system may be used to represent complex data and allow users to create and manage complex data relationships. However, data management software increases the computing resources required to manage complex data because of the additional computing resources required to run the software and to manage any metadata repositories used to store graph component attributes. Many times, data management software utilizes hierarchical file systems to store data, and accommodates more complex data relationships among the stored data by drawing on supplemental sources of information, such as metadata files stored in the hierarchical file system or external databases maintained by the software. As such, data management software may require significant allocated memory and storage. Also, when complex data management is required for a cloud-based application, data management software may not be made available by the cloud administrators or may not be compatible with the operating system of the cloud infrastructure. Thus, managing and accessing data with data management software is generally more error-prone, less available, less efficient, and less cost effective than managing and accessing data within an operating system-implemented file system.

As such, it would be beneficial to adapt an operating system-implemented file system to accommodate complex data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 1 depicts a file system hierarchy.

FIGS. 2A and 2B depict example computing systems.

FIG. 6 depicts an example gnode table.

FIGS. 7A-7B depict another example gnode table.

FIG. 8 depicts an example graphical user interface that allows a user to define labels for graph components and associate those labels with properties for graph component metadata.

DETAILED DESCRIPTION

Figure 2A:
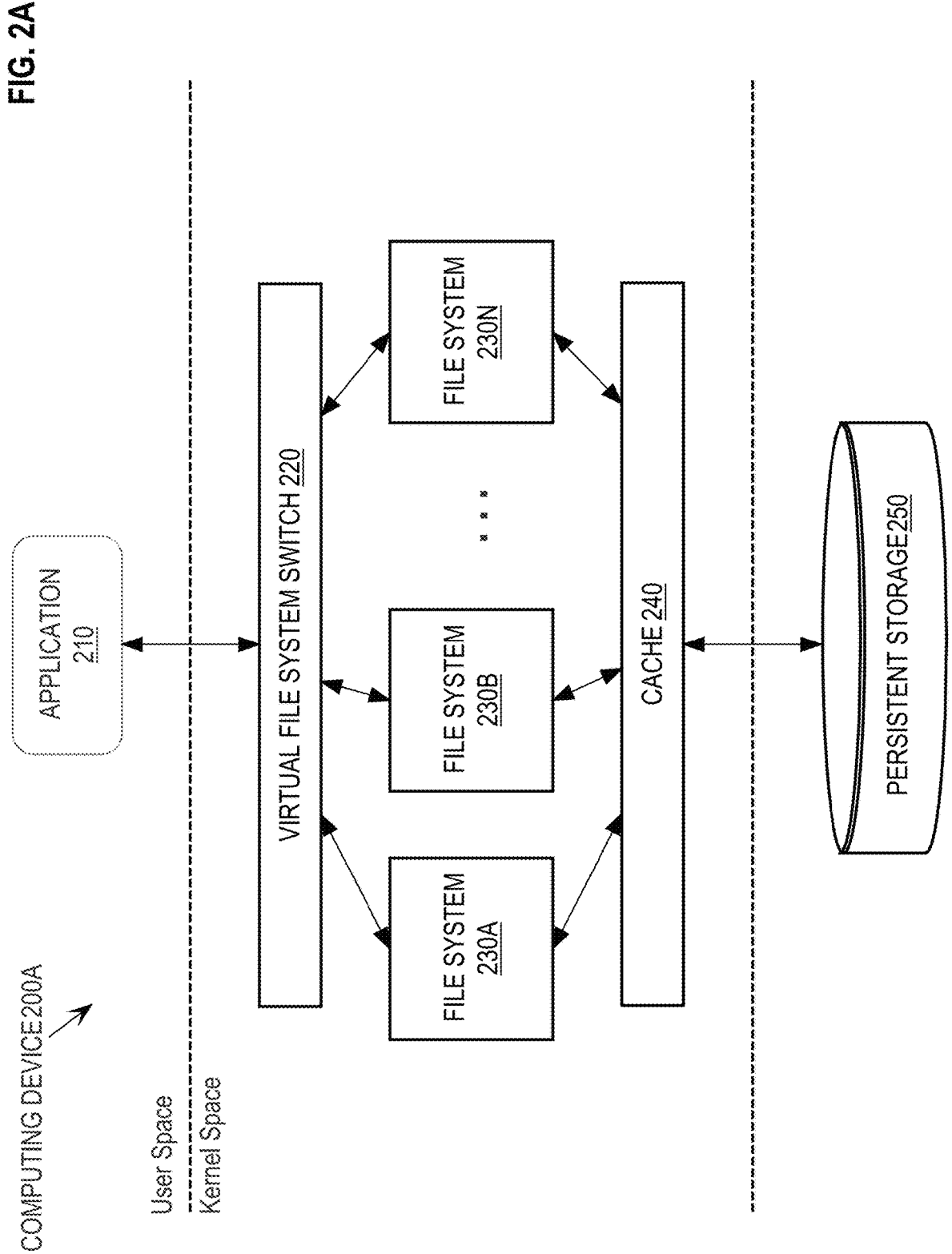

In the following description, for the purposes of explanation, numerous specific details are set forth in order to provide a thorough understanding of the described techniques. It will be apparent, however, that the described techniques may be practiced without these specific details. In other instances, well-known structures and devices are shown in block diagram form in order to avoid unnecessarily obscuring the techniques described herein.

1. General Overview

Techniques are described herein for a graph-organized file system (GOFS) implemented by an operating system of a computing system. A GOFS represents a data graph with graph components comprising a plurality of nodes and one or more relationships between the nodes. Each node of the graph may be associated with content (of any kind) and/or relationships (of any kind) between the node and other nodes in the graph.

Data for a GOFS is stored in a GOFS partition in persistent storage. In the GOFS partition, nodes are represented using "gnode" data structures (also referred to herein as "gnodes"), each of which comprises a content field for node content data and an edge field for edge data representing relationships between nodes. Specifically, each relationship is between two nodes, and is represented by two edge entries in the gnodes representing the related nodes. Each edge entry represents a single edge, which is a directional relationship component whose source is the node that is associated with the edge entry and whose destination is identified in the edge entry. In addition to including an identifier of the destination gnode for the represented edge, each edge entry includes a name of the destination node. As described in further detail below, gnodes are similar to inodes in traditional file systems, with some differences.

According to various embodiments, a relationship that is represented by a first edge entry (from node A to node B) and a second edge entry (from node B to node A) may be made one-directional (e.g., from node A to node B only) by marking the second edge entry as "hidden" (e.g., using metadata and/or a flag for the edge entry). Marking the unwanted edge as "hidden" allows the operating system to maintain the graph data. For example, in order to delete a node B from the graph where there is a one-directional relationship from a node A to node B, all references to node B should also be deleted. The operating system may use the hidden edge entry in the gnode for node B to identify the one-directional relationship from node A to node B and remove the edge entry that identifies node B from the gnode for node A.

According to various embodiments, a GOFS partition includes dedicated space for each of: a superblock, graph metadata, a block bitmap, a gnode bitmap, a gnode table, and data blocks. The block bitmap indicates which data blocks in the partition are occupied. The gnode table includes a plurality of slots for gnodes, and the gnode bitmap indicates which of those slots are occupied. Further, the superblock identifies a root gnode and, according to various embodiments, includes a name of the root gnode. The root gnode of a GOFS identified in the superblock may be changed, which effectively changes the mount point of the GOFS. Because any absolute paths to nodes within a graph represented by a GOFS is interpreted based on the root gnode identified in the superblock, changing the root gnode of the GOFS changes how the absolute paths are interpreted.

GOFS is implemented in a kernel space of a computing system. As such, GOFS commands (e.g., originating from an application in a user space of the computing system) are transmitted to the operating system for implementation. GOFS commands may be submitted to the operating system via an application programming interface (API), a graphical user interface, or via a command line interface from the user space. According to various embodiments, a file system command is received by a file system interface of the operating system. The file system interface determines whether the command is for a hierarchical file system managed by a virtual file system switch (VFS) or for a GOFS of one or more GOFS maintained by the computing system. If the command is for a hierarchical file system, the command is communicated to the VFS for handling. However, if the command is for a GOFS, the file system interface causes the file system command to be executed using the GOFS partition without intervention from the VFS. Because it is implemented in the kernel space, GOFS management and implementation of submitted GOFS commands does not require intervention of any software running in the user space.

According to various embodiments, gnode data structures and/or edge entry data structures include one or more "in-structure" metadata values for properties of the represented node or relationship. Further, according to various embodiments, a GOFS partition includes dedicated space for node and/or relationship metadata. This metadata space may be used to store "out-of-structure" metadata values, such as key-value pairs, which expands the amount of space available for graph metadata beyond what could feasibly be stored in gnodes and edge entries. The metadata values in the dedicated metadata space, for the graph, may be accessed using an associated gnode identifier or relationship identifier. Furthermore, the metadata space may be used to store metadata for the superblock, which are metadata values for the GOFS or graph itself rather than for individual graph components.

Search operations may make use of the metadata in the gnodes, edge entries, and/or dedicated metadata space to efficiently identify search results from a graph, without requiring accessing content of the nodes to identify the search results. Search operations may include search criteria that involves in-structure metadata values for nodes and relationships, as well as graph pattern matching and out-of-structure metadata values. Accessing in-structure metadata values for a particular search operation may be performed using an index or from within the graph component data structures themselves. At times, using an index to access in-structure metadata property values is more efficient than accessing the in-structure metadata property values within the graph component data structures. When the search criteria of a search operation involve out-of-structure metadata values, generating search operation results can be performed based, at least in part, on accessing dedicated metadata storage 320, e.g., using graph component identifiers, to retrieve the out-of-structure metadata values. When out-of-structure metadata values are indexed, accessing the out-of-structure metadata values may be performed using the index.

Using GOFS to store data allows for more flexibility to classify data and to identify nuanced relationships between data than is possible with a strictly-hierarchical file system, e.g., given that nodes in the represented graph may be related to any number of other nodes, and the graph components may be associated with any kind of metadata. The increased flexibility allows applications with a variety of files, having a variety of relationships, (such as software packages, binary dependencies, system configurations, machine learning or artificial intelligence data, etc.) to be accurately represented by the operating system, and to be efficiently and effectively accessed without forcing non-hierarchical data into a hierarchical data structure.

Accordingly, GOFS provides unmatched performance for maintaining and processing complex data, such as data for artificial intelligence, social networking, software packaging, maps/geographical applications, 3D rendering, video games, web design, cloud applications, etc. For example, implementing graph data structures using data management software is not always portable to cloud infrastructure, where the operating system of the cloud infrastructure is generally not under the user's control. Specifically, the data management software being used may not be compatible with the operating system implemented on the cloud infrastructure. Implementation of graph data structures at the operating system level ensures that all users have access to the graph features, including after porting graph data structures in a GOFS to a cloud infrastructure that is GOFS-compatible.

Furthermore, the GOFS techniques described herein allow for backward compatibility with the use of strictly-hierarchical file systems in that the graph data structure may be configured to represent strictly-hierarchical data, i.e., by creating only one kind of relationship (e.g., "contains"/"is_contained_by" relationships) between nodes of the file system graph. Thus, the techniques described herein add to strictly-hierarchical file system capabilities, giving users much more flexibility in representing both hierarchical and non-hierarchical data.

GOFS further provides flexibility for massive scale out, and supports massive data storage. For example, any number of GOFS may be connected and mounted within a computing device or a cluster of computing devices (where a "computing system" as used herein may be either a single computing device or cluster of computing devices), with the only limiting factor being the hardware. Also, because GOFS is implemented by the operating system, software in the user space is not required to record or maintain graph-based data features for file system data. A user may import GOFS data created in one system into a second system supporting GOFS, and the ported data will maintain all graph-based relationships and metadata because of the file system-level encoding of the graph data.

GOFS further provides ultra-speed for embedded applications, e.g., with limited system resources. Specifically, because GOFS encodes metadata for nodes and relationships at the file system level, applications are able to perform file system operations without accessing additional sources of information, such as a software-maintained databases. Thus, in addition to the flexibility and expanded capabilities of a GOFS, GOFS provides computing improvements because file system operations need not involve software in the user space, which is inherently less efficient than software running in the kernel space.

2. Operating System Implementation of a Graph Organized File System

GOFS is implemented in a kernel space of a computing system. As such, GOFS commands (e.g., originating from an application in a user space of the computing system) are transmitted to the operating system for implementation. FIG. 2A depicts an example computing system 200A running an application 210 in a user space of the computing system. In system 200A, application 210 uses Portable Operating System Interface (POSIX) file system commands to interact with a particular file system, of file systems 230A-230N, via a virtual file system switch (VFS) 220 implemented in a kernel space of system 200A. File systems 230A-230N are kernel software that may implement any type of file system, such as NTFS, XFS, ext3fs, ext4fs, Fat32, ZFS, btrfs, ACFS, UFS, Minix, Ceph, etc.

VFS 220 is a layer of software that causes the particular file system to implement POSIX file system commands issued by application 210 for hierarchically-organized file systems by translating the POSIX commands to instructions that are specific to the target hierarchically-organized file system. Because VFS 220 abstracts the details of how a particular file system implements the POSIX command, application 210 may issue any type of POSIX command (such as Open, Read, Write, or Close) without modification for any type of file system. The target file system implements the received command on the identified file/directory, and the details of how the file is stored (e.g., within cache data 240 and persistent storage 250) is automatically managed by the file system software.

VFS has decades of maturity, and excels in performance. However, VFS is very closely tied with hierarchically-organized file systems (which store data in a strictly hierarchical tree structure). Thus, according to various embodiments, file system commands that include GOFS commands are handled as depicted in FIG. 2B. Specifically, FIG. 2B depicts an example computing system 200B that implements a file system command interface 260 that routes file system commands (such as hierarchically-organized file system commands or GOFS commands described in further detail below) to VFS 220 (in the case of hierarchically-organized file system commands) or to a GOFS (in the case of GOFS commands) of one or more GOFS implemented by system 200B, such as GOFS 270. GOFS 270 is example kernel software that implements a particular GOFS according to techniques described herein.

According to various embodiments, GOFS 270 uses most of the same caches (e.g., in cache data 240) and services utilized by file systems 230A-230N. For example, to improve the latency of GOFS-based I/O read and write operations to persistent storage 250, GOFS 270 maintains and/or utilizes one or more caches, such as a page cache 242, a gnodes cache 244 (where the gnodes cache is similar in function and/or form to an inodes cache), and/or a graph cache 246, which can be built in memory of one or more of the implementing computing devices. According to various embodiments, graph cache 246 caches edge entry information being used by the operating system. Page cache 242 and gnodes cache 244 may also be used by VFS 220 as a page cache and inodes cache, respectively. Furthermore, graph cache 246 may facilitate caching of dentries, i.e., data structures that represent directory information in a directory-based file system, and as such may be used as a dentries cache by VFS 220.

3. Multi-Device Implementation of a Graph Organized File System

Multiple computing devices may store data for the same graph, e.g., as part of a cloud implementation of GOFS. For example, in a distributed multi-device implementation, each device maintains a GOFS partition, as described in detail below, which stores a portion of data for the graph. Each device may store distinct portions of the graph, and/or may store at least some of the same graph data as one or more other devices. Data identifying a particular device that stores the root node, and which gnode to mount may be stored in the superblock metadata or in an external database, etc. As another example, in a multi-device implementation, multiple computing devices access the same graph data that is stored on persistent storage that is accessible by all of the multiple computing devices. In a multi-device GOFS implementation, the devices may coordinate using one or more software agents.

4. GOFS Data Structures

4.1. GOFS Partition

Figure 3:
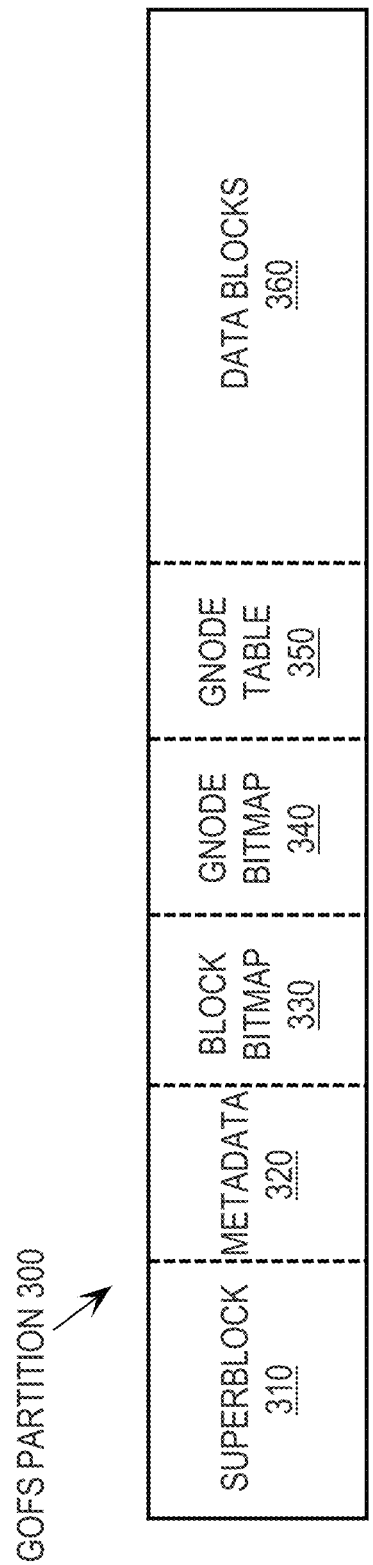
FIG. 3 depicts an example graph-organized file system partition.

According to various embodiments, system 200B stores data for GOFS 270 in a GOFS partition in persistent storage (such as persistent storage 250). FIG. 3 depicts an example GOFS partition 300, which includes a superblock 310, dedicated metadata storage 320, a block bitmap 330, a gnode bitmap 340, a gnode table 350, and data blocks 360. Metadata storage 320 stores metadata for superblock 310, gnodes, and/or relationships as described in further detail below. Gnode table 350 comprises a plurality of slots that store gnode data structures, and gnode bitmap 340 indicates which slots in gnode table 350 are occupied. Block bitmap 330 indicates which data blocks of data blocks 360 (allocated to store content data for gnodes and edge entry data structures, etc.) are occupied.

Superblock 310 of partition 300 is similar to a Unix superblock and contains overview information about the GOFS. Specifically, according to various embodiments, the superblock stores a size of partition 300, an identifier of a root gnode of GOFS 270, a name of the root gnode, a name of partition 300, a modification timestamp for partition 300, etc. As described in further detail below, a root node of a GOFS may be changed. As such, according to various embodiments, root gnode information maintained in superblock 310 comprises a gnode identifier, where the gnode for the root node is stored with the other gnodes for the partition in gnode table 350.

4.2. Dedicated Metadata Storage

According to various embodiments, GOFS 270 provides one or more mechanisms for storing metadata values for properties of graph components, i.e., distinct from any content associated with the graph components. Associating graph components with metadata values allows users of GOFS 270 to encode a variety of meanings into the graph components. Given that the stored metadata values are accessible to GOFS 270 without requiring the system to access node content data, associating graph components with metadata values allows diverse inexpensive lookup functions and read entry functions, and increases the potential power of search operations performed over GOFS data.

The properties of a graph component, associated with graph component metadata values, may be anything chosen by a user, such as weight, type, genus, classification, or any other attribute of a graph component. According to various embodiments, the metadata values are stored as key-value pairs, with a property identifier as the "key" of a given key-value pair and an associated metadata value as the "value" of the key-value pair. Metadata values for properties of graph components may be stored in dedicated metadata storage 320 ("out-of-structure" values) or in graph component data structures ("in-structure" values, as described in further detail below). The metadata values stored in dedicated metadata storage 320 are referred to as "out-of-structure" values because these values are not stored in the data structures representing the graph components, but instead are stored in the dedicated metadata storage of the GOFS partition.

According to various embodiments, out-of-structure metadata values are accessed based on identifiers of the graph components to which the metadata values pertain, or based on metadata identifiers stored in the data structures for the graph components, etc. For example, out-of-structure metadata values for a particular relationship are accessed using the relationship identifier for the particular relationship (which is associated with both edge entries representing the relationship, as described in further detail below), and out-of-structure metadata values for a particular node are accessible using the gnode identifier for the particular node.

According to various embodiments, GOFS 270 establishes a node metadata hash table and a relationship metadata hash table in dedicated metadata storage 320, and identifies buckets of the hash tables in which to store particular metadata values based on the identifier of the graph component associated with the metadata values. Each hash bucket includes out-of-structure metadata values for all graph components whose identifiers hash to the bucket, e.g., in a linked list of hash table entries. To illustrate, when a graph component identifier hashes to a particular bucket, an entry with out-of-structure metadata values for the graph component and an identifier of the component is added to any existing list of entries in the bucket. To retrieve the out-of-structure metadata values for the graph component, the graph component identifier is hashed to identify the bucket for the graph component, and the data structure in the bucket is traversed to identify the entry that includes the identifier of the graph component.

According to various embodiments, metadata values are stored for a relationship, which is represented by two edges. Metadata values for a relationship that relate to a single edge of the relationship may be identified in any way, e.g., by associating the metadata values with a gnode identifier identifying the source node of the pertinent edge, by associating the metadata values with an edge identifier that is unique to the pertinent edge, by creating a relationship property that is inherently associated with a particular edge of the relationship, etc.

Furthermore, the metadata space may be used to store metadata for the superblock, which are metadata values for GOFS 270 or graph itself rather than for individual graph components. For example, GOFS 270 stores key-value pairs for the superblock associated with a reserved identifier that identifies superblock metadata values, where this reserved identifier may be used to retrieve the superblock metadata values. Such metadata values may include values for a root gnode name, a root gnode identifier, extra device, extra volume manager, etc., examples of which include: nodeBitmapDevice=/dev/sdb1; BlockMapDevice=/dev/sdb2; FilesystemID=3ef81ac24e; Journal=Yes; FlushOnWrite=Yes; MetaDataIndex=RBT; and SpareVolumeData=/dev/volumes/4de8fb213ab6.

TABLE 1

| content data, edge data, and gnode metadata | | | | | | | | |
|---|---|---|---|---|---|---|---|---|
| user | | | group | | | others | | |
| r | w | x | r | w | x | r | w | x |

For GOFS 270, permission information in gnode 400 may apply to content data, edge data, or gnode metadata. The 9-bit permission scheme of Table 1 utilizes the same permission bits for content data permissions, edge data permissions, and gnode metadata permissions.

According to various embodiments, Table 2 below depicts another example gnode permission scheme with 24 bits (rather than the 9 bits depicted above):

TABLE 2

| gnode metadata | | | | edge data | | | | | | content data | | | | | |
|---|---|---|---|---|---|---|---|---|---|---|---|---|---|---|---|
| user | | group | | user | | group | | others | | user | | group | | others | |
| r | w | r | w | r | w | r | w | x | r | w | x | r | w | x | r | w | x | r | w | x | r | w | x |

4.3. Gnode Data Structure

GOFS 270 maintains, in GOFS partition 300, a gnode table 350 storing a gnode data structure ("gnode") for each node in the graph represented by GOFS 270. Nodes, represented by gnodes, may variously be associated with no data or with any kind of data, such as text data, spreadsheet data, utility data, executable data, library data, image data, video data, etc., and each node has one or more relationships to one or more other nodes.

Figure 4:
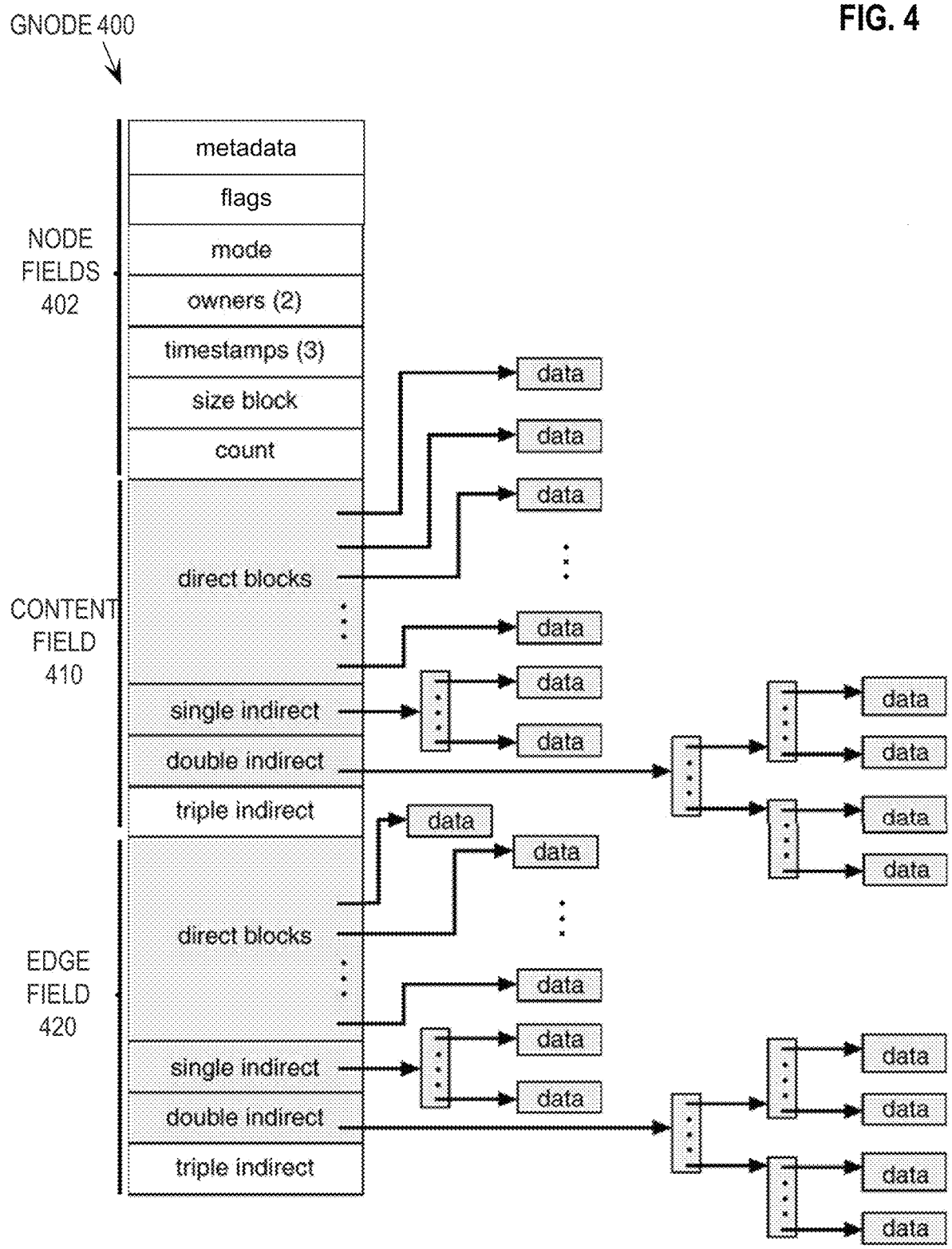
FIG. 4 depicts an example gnode data structure.

FIG. 4 depicts an example gnode 400, which is identified by a gnode identifier (e.g., corresponding to the slot in gnode table 350 that the gnode occupies) and contains information defining the represented node. Example gnode 400 includes a plurality of node fields 402, a content field 410 for node content data (if any), and an edge field 420 for relationship data. In example gnode 400, content field 410 comprises pointers to data blocks in data blocks 360 that store the content data, and edge field 420 stores edge entry data structures ("edge entries") representing relationships for the node and/or pointers to data blocks in data blocks 360 storing edge entries, as described in further detail below. Example node fields 402 store an in-structure metadata value for each of one or more particular node properties, one or more node flags, mode information, owner information, a group identifier, timestamps for the node, a size of content data for the node, a count of edges originating at the node, etc.).

The mode field of gnode 400 comprises permission information for the node. The traditional Unix permission scheme for inodes is based on nine bits comprising a bit for each of read, write and execution permissions for each category of: user, group, and others. Those bits cause the system to adopt different behaviors depending on whether the inode represents a file or a directory. According to various embodiments, such a scheme is implemented for gnodes (i.e., in the mode field of a gnode), as depicted in Table 1 below:

The 24-bit permission scheme of Table 2 provides a set of bits for each of content data, edge data, and gnode metadata, which allows detailed control and access restriction of each type of data. According to various embodiments, the gnode metadata bits of the permission information indicate permissions for reading or writing for in-structure/out-of-structure metadata values and/or for information in node fields 402. The first six bits control gnode metadata reading and writing, the next nine bits applied to edge data work like the Unix standard permissions scheme for directories, and the last nine bits applied to content data work like the Unix standard permission scheme for files.

According to various embodiments, gnode 400 further comprises a flags field, e.g., a 64-bit field, the bits of which may be used as one or more flags for the represented node. According to various embodiments, the flag field of gnode 400 includes one or more "visited" flags. The one or more visited flags can be used by one or more search algorithms over the graph data to track which nodes have been visited by each search algorithm. In the case of a 64-bit flag field, up to 64 concurrent search operations running over the graph data may make use of a respective flag of the visited flags. A mutex or semaphore may be used to prevent deadlocks between applications accessing the flag field.

According to an embodiment, the flags field includes "system" information comprising multiple bits corresponding to the following gnode type attributes: standard, pipe, socket, block device, and/or char device. The system information can also be embodied in a number or other type of value indicating the gnode type attributes, rather than a set of bits. Furthermore, the system information may be stored in a distinct field of node fields 402 other than the flags field.

As indicated above, example content field 410 depicts pointers to data blocks that store content data for the represented node. However, some applications (such as neural networks) may require nodes with only a small amount of content data, if any. For example, a GOFS file system that represents neural network data represents the needed data in gnode metadata, relationships between nodes, weight metadata for edges (e.g., in in-structure metadata values), and a small amount of node content data. Thus, according to various embodiments, content field 410 may directly store content for the represented node instead of storing pointers to data blocks 360 that store content for the represented node. In such embodiments, gnode 400 includes a content interpretation flag (e.g., in the flags field or in a dedicated location of content field 410) that indicates whether content field 410 should be interpreted as content data or as pointer data. According to various embodiments, an extra field may be added to gnode 400 to directly store content data, where content field 410 is interpreted as one or more pointers to additional content data.

4.4. Edge Entry Data Structure

Figure 5A:
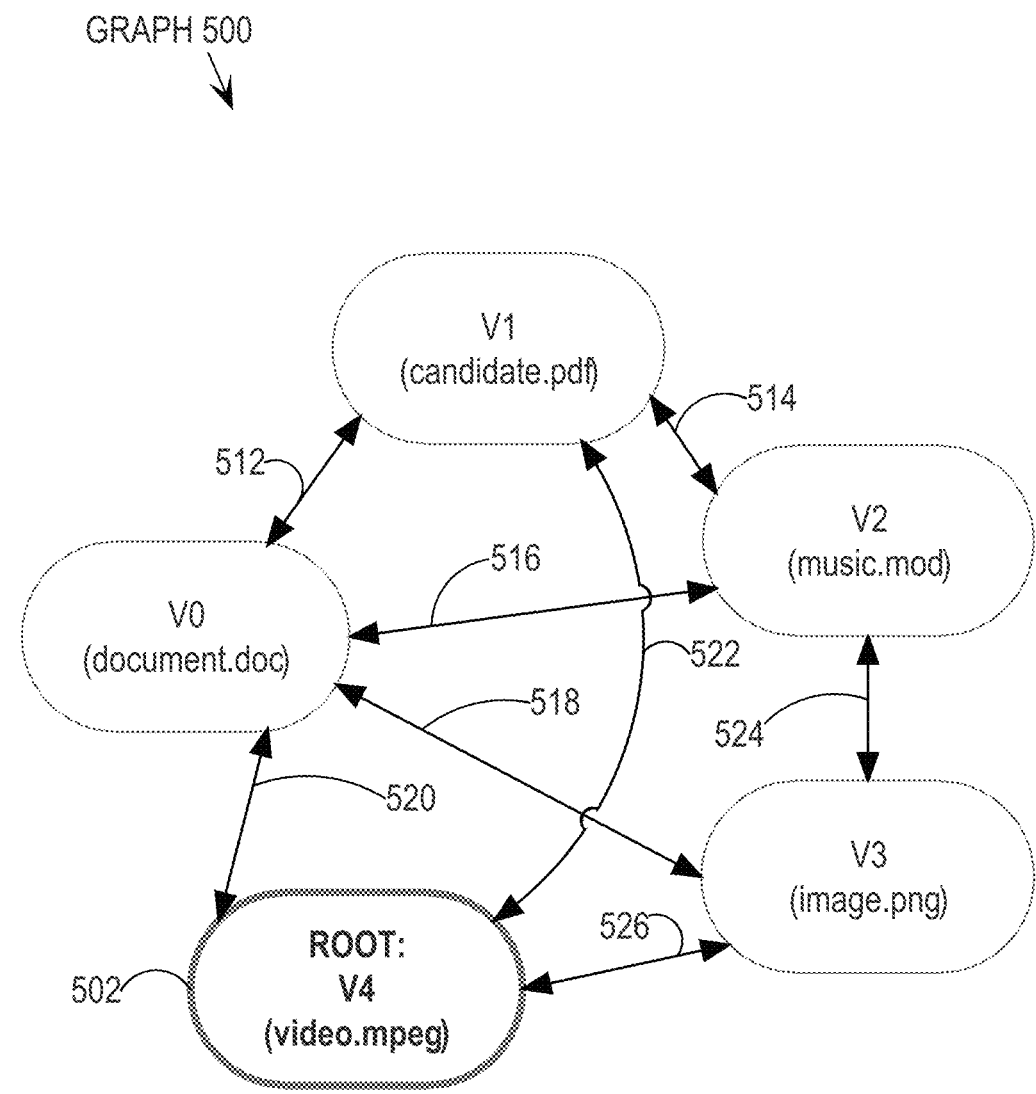
FIGS. 5A and 5B depict example graphs.
Figure 5B:
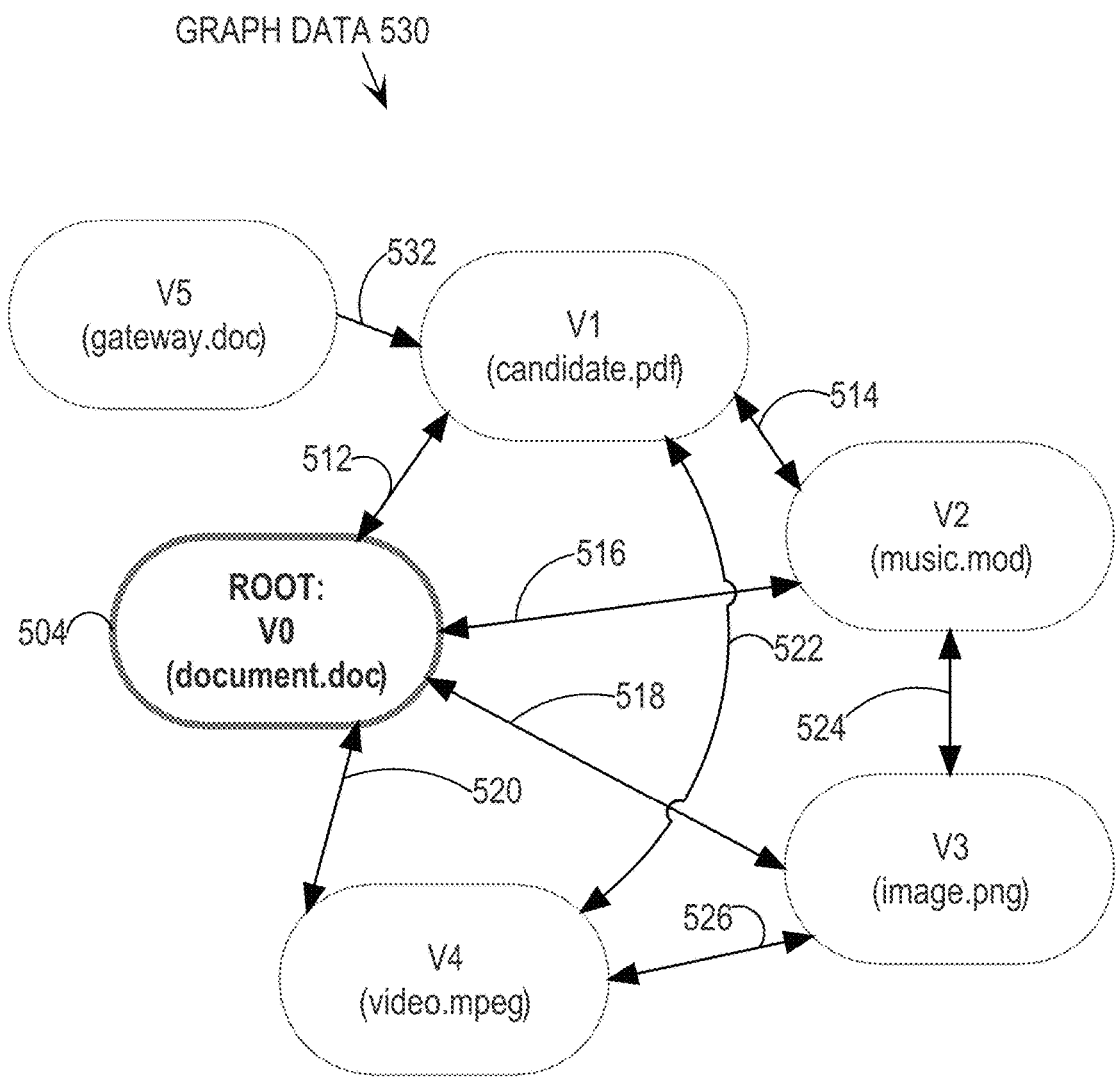

The relationships of a GOFS are not restricted to the directory-based relationships of hierarchical file systems. According to various embodiments, the number of relationships that may be associated with a given node is unlimited, and each relationship could represent any type of relationship between nodes. To illustrate, FIG. 5A depicts an example graph represented by GOFS partition 300 and FIG. 5B depicts another example graph represented by GOFS partition 300. In particular, FIG. 5A depicts graph 500 with nodes V0-V4 that are represented by gnodes as described above, and relationships 512-526 between the nodes. Each of nodes V0-V4 is shown in FIG. 5A to have a name with an associated extension identifying a type of content data that is or may be stored by the node, and each node has one or more relationships with one or more other nodes.

According to various embodiments, each relationship of a graph represented by GOFS partition 300 has two edges. Each edge is directional, having a source (or subject) node and a destination (or object) node. An edge whose source is a particular node is referred to herein as an outgoing edge for the source node, and an edge that identifies a particular node as the destination of the edge is referred to herein as an incoming edge for the destination node. For example, relationship 512 is represented by a first edge V0→V1 (where V0 is the source node and V1 is the destination node) and a second edge V1→V0 (where V1 is the source node and V0 is the destination node). Thus, V0→V1 is an outgoing edge for V0 and V1→V0 is an outgoing edge for V1.

Each edge of a graph is represented by an edge entry data structure ("edge entry") included in or identified by the edge field 420 in the gnode representing the source node of the edge. Further, each edge entry includes a relationship identifier for the relationship represented by the edge, a gnode identifier for the destination node of the edge, and a name for the destination node of the edge. According to various embodiments, each edge entry further includes a field for metadata values for either the represented edge or for the relationship of which the represented edge is a part. These metadata values are "in-structure" metadata values given that they are stored in the edge entries themselves rather than in dedicated metadata storage 320. According to various embodiments, edge entries include references to out-of-structure metadata values, for the represented edges, within dedicated metadata storage 320.

According to various embodiments, each edge entry further includes a flag field with one or more flags for the represented edge. Flags for an edge represented by each edge entry comprise one or more of: a traversable flag, a hidden flag (such as an operating system-specific hidden flag, and/or a user-initiated hidden flag), or a visited flag, etc. The traversable flag may be used to indicate whether the represented edge may be used to access the destination node. A user may utilize the user-initiated hidden flag to "hide" a particular edge (e.g., in connection with a particular search operation), where the user has the option to "unhide" the edge. A visited flag may be used to identify whether the edge has been "visited" e.g., by a search operation. According to various embodiments, each edge is associated with a plurality of visited flags that may be used by a respective plurality of concurrent search operations, similar to the visited flags of gnodes described above. The operating system-specific hidden flag is described in further detail below.

FIG. 6 depicts an example gnode table 600, which is an example of gnode table 350 of partition 300. Each gnode in table 600 (a) represents one of nodes V0-V4 of graph 500 and (b) includes node fields 402, content field 410, and edge field 420 identifying edge entries for outgoing edges of the represented nodes. In table 600, all content but the edge fields in the gnodes is abbreviated to better illustrate the edge entries. Furthermore, the edge entries of a gnode are depicted as being included in the gnode. However, the edge entries may be stored in data blocks 360 and references to the pertinent data blocks may be stored in edge field 420.

As depicted in gnode table 600, each edge entry includes a relationship identifier, which is the same for both edges of the relationship. According to various embodiments, each edge may be assigned unique identifiers, for example, by concatenating an edge-specific value to a relationship identifier, such as 512_A and 512_B for the edges of relationship 512. Use of the relationship identifier for both edge entries of a relationship allows the operating system to quickly identify both edge entries for a given relationship. Thus, the operating system may perform relationship-based operations on both edge entries for a relationship, or may easily identify the edge entries for a relationship that should be removed.

According to various embodiments, each edge entry includes a metadata field, e.g., a 64-bit weight field, which stores one or more in-structure metadata values. Further, the metadata field may comprise a pointer to metadata values for the edge in dedicated metadata storage 320. Embodiments may encode in-structure metadata values for edges in any way, such as key-value pairs identifying properties of the represented edge or relationship. The key-value pairs may be set and interpreted by various applications utilizing the GOFS data, and may allow powerful and efficient searches over the graph data.

The in-structure edge metadata values may be used to store different metadata values for the edges of a given relationship, such as different weights or types of the edges. As shown in gnode table 600, the edges of relationship 512 have the same in-structure weight metadata value ("111"), but the edges of relationship 514 have different weights ("7981" for V1→V2, and "12" for V2→V1). As a further example, a particular relationship between a node A and a node B is represented by a first edge entry A→B and a second edge entry B→A. In this example, the nodes represent people and the relationship is a parental relationship where node A represents the parent and node B represents the offspring. Thus, the two edges of the relationship have different types, i.e., the type of A→B is "parent of" and the type of B→A is "offspring of". To represent the different edge types, the relationship metadata may include the properties "source_parent_of" and "source_offspring_of", where metadata values stored in dedicated metadata storage 320 indicates that "source_parent_of=A_ID" and "source_offspring_of=B_ID" (where "A_ID" is a gnode identifier of node A and "B_ID" is a gnode identifier of node B). Further, edge entry A→B and edge entry B→A may each be associated with in-structure "type" properties, e.g., where edge entry A→B is associated with the "type" metadata value "parent of" and edge entry B→A is associated with the "type" metadata value "offspring of".

As indicated above, edge entries store the "names" of the destination graph nodes for the represented edges. According to various embodiments, different edge entries may identify different names for the same graph node.

4.5. One-Directional Relationships

Notwithstanding being represented by two edges, a relationship may be one-directional. To illustrate, FIG. 5B depicts a graph 530 that is similar to graph 500, except for an additional node V5 and a one-directional relationship 532 originating at V5 (source node) and terminating at V1 (destination node). Example gnode table 700 of FIGS. 7A-7B shows the gnodes and edge entries representing graph 530. As shown in example gnode table 700, one-directional relationship 532 (which has a source node and destination node) is represented by two edge entries, one at the source gnode V5 and one at the destination gnode V1.

The edge entries of the gnodes in table 700 include a flags field that depicts an operating system-specific hidden flag for each edge entry. The operating system-specific hidden flag may be used to indicate whether the represented edge is hidden by the operating system, such as the edge of a one-directional relationship that is contrary to the direction of the relationship. Returning to the discussion of table 700, the operating system-specific hidden flag for all of the edge entries in table 700 are set to "FALSE" except for the edge entry for relationship 532 recorded at the gnode for V1, which is set to "TRUE". This flag indicates that relationship 532 is one-directional originating at V5 and terminating at V1.

Marking the unwanted edge as "hidden" allows the operating system to maintain the graph data. For example, in order to delete V1 from the graph, both the gnode for V1 and all edge entries terminating at V1 should be deleted from table 700. The operating system may use the edge entries of the gnode for V1 to identify all gnodes with edge entries identifying V1. Thus, because the edge for relationship 532 originating at V1 is hidden and not absent, the "hidden" edge entry can be used by the operating system to determine that V5 has an edge entry with the destination of V1 that should be deleted.

An edge that is hidden by the operating system may behave differently than an edge that is hidden by a user, such as a user without at least a certain level of privileges (e.g., "root" privileges) may not "unhide" the edge hidden by the operating system, except under certain circumstances. In the case of an operating system-specific hidden flag that is used to hide a contrary edge of a one-directional relationship, a user may clear the operating system-specific hidden flag for the edge by converting the one-directional relationship into a two-directional relationship.

The ability to create one-directional relationships within a GOFS has utility in various contexts, such as in the context of programmatic containers or virtual machine (VM) instances. Programmatic containers encapsulate computer program applications within individual, relatively isolated runtime environments that use the operating system kernel of the host computer. VM instances also encapsulate computer program applications within individual, isolated runtime environments and include entire operating systems that are run by a hypervisor on top of the operating system kernel of the host computer. A container or VM instance may bundle into a single package an application program with its dependencies, libraries, and configuration files, which is portable between computing devices with different environments.

When a hypervisor of a computing device hosts multiple virtualization instances comprising containers and/or virtual machines, the nodes represented by these virtualization instances may be considered as part of the same graph maintained for the computing device. One-directional relationships that connect a virtualization instance-specific "root" node of each virtualization instance to the rest of the graph can prevent apps within the virtualization instances from getting out of the portions of the graph representing the virtualization instances, while the hypervisor may still have access to the data in the mounted virtualization instances.

4.6. Disconnected Nodes

All nodes in a graph should be accessible from the root node of the graph. To this end, nodes are created, in a GOFS, with one or more relationships that connect them, either directly or indirectly, with the root node of the GOFS. However, deleting nodes or relationships from a graph has the potential to disconnect one or more nodes from the root node. To illustrate in the context of graph 530, deleting the relationship between V5 and V1, or deleting V1 from the graph, would leave V5 as a disconnected node with no relationship that connects the node to root node V0.

Thus, according to various embodiments, in connection with executing any deletion operation that deletes a relationship or node from a graph, the operating system checks to determine whether the deletion operation would disconnect any nodes from the root node (such a deletion operation is referred to as a "disconnecting" deletion operation). If the deletion would result in one or more disconnected nodes, the operating system performs one or more of the following actions: deleting a disconnected node; or adding a relationship between a disconnected node and a particular other node in the graph. The action taken in this context may be an action directed by the user, e.g., in configuration information or as a result of asking the user what to do with the disconnected node in response to determining that the requested deletion operation is a disconnecting deletion operation. The particular other node that is automatically related to the disconnected node may be a default node or may be identified by the user, e.g., in configuration information or as a result of asking the user which node should be related to the disconnected node. The particular other node may be generated in a default location or a user-indicated location if it is not already in existence when a disconnecting deletion operation occurs.

4.7. Changing the Root Node

Any node in GOFS 270 may be the root node for the file system data, identified in superblock 310. Furthermore, the root node identified in superblock 310 may be changed to any node within the graph. According to various embodiments, when the identifier of the root gnode is changed, the name of the root gnode maintained for superblock 310 (e.g., in metadata for superblock 310) is also changed. To illustrate in the example of graph 500, graph node 502 ("V4") is the root node of the graph, which is reflected in superblock 310. Thus, the absolute path each of nodes V0-V4 begins at root node 502, as follows:

V0: ^V4/V0
V1: ^V4/V1
V2: ^V4/V3/V2 or ^V4/V0/V2 or ^V4/V1/V2
V3: ^V4/V3
V4: ^V4

It is noted that, in these examples, the root node is identified by name (i.e., "V4") with a '^' character to identify it as the root node of the graph. However, the root node may be represented in any way, such as using "/" to represent the root node, resulting in absolute paths beginning with "/" to identify them as absolute, e.g., "/V0" as an absolute pathname identifying V0. Further, the shortest pathnames for each node are provided above. However, one or more alternative pathnames may be used to identify a node that are other than the shortest path, when such alternative paths exist in the graph. For example, an alternative absolute pathname for V0 is "^V4/V3/V2/V0", which is one of many valid paths through graph 500 from ^V4 to V0.

A user may change the root node of the graph from V4 to V0, as depicted in graph 530 of FIG. 5B. Thus, the absolute path each of nodes V0-V4 begins at the new root node 504, as follows:

V0: ^V0
V1: ^V0/V1
V2: ^V0/V2
V3: ^V0/V3
V4: ^V0/V4

Pathnames identifying nodes of a graph may be relative to a current ("working") node, instead of being absolute paths. For example, in the context of graph 500, while V3 is the working node, a user traverses directly from V3 to V1 using the relative path to V1 from V3 ("cd V2/V1") or using an absolute path identifying V1 ("cd ^V4/V1").

According to various embodiments, a command such as chrootsys causes the root gnode for the system to be changed, as described in detail above.

4.8. Metadata Indices

In-structure metadata values may be accessed very quickly in connection with a graph pattern-based query over the graph data, such as a graph pattern query that is configured to perform a search such as: "find all node that are related to the medical record of Joe Smith within three hops" or "find all the texture-type nodes that are linked to the 3d design project represented by a given node". For example, a particular search operation may have criteria based on a graph pattern and also based on particular in-structure metadata values (such as find all nodes that represent mothers younger than 25 with at least one offspring that is 7 years old and older, where age is a node property associated with in-structure metadata values). While traversing the graph to identify nodes that satisfy the graph pattern, it is generally highly efficient to determine whether the graph components also satisfy the search criteria that is based on in-structure metadata values because those values are stored in the graph component structures themselves.

However, for a search operation that does not involve a graph pattern, but instead has search criteria based on in-structure or out-of-structure metadata values (such as find all nodes representing people older than 85), identifying graph data that satisfies the search criteria generally requires traversal of dedicated metadata storage 320, or traversal of the graph component data structures to access the in-structure metadata values. To mitigate the need to traverse graph component data structures in order to identify graph components with particular in-structure metadata values, the in-structure metadata values may be loaded into graph cache 246 and/or into a metadata cache maintained by GOFS 270 (e.g., within cache data 240 and/or within a GOFS partition). Any changes made to the in-structure metadata values causes invalidation of the cached copies of the changed values.

Thus, according to various embodiments, dedicated metadata storage 320, and/or data blocks 360, stores one or more indices (such as b-tree indices) on one or more graph component metadata properties corresponding to one or more out-of-structure and/or in-structure metadata values. The one or more indices may be used to speed up queries over the graph by quickly identifying which graph components are associated with particular metadata values.

For example, graph components (either nodes or relationships) of GOFS 270 are associated with a "type" property, which is expected to be used as search criteria for search operations over the file system. Accordingly, the operating system creates, in partition 300, an index for values of the "type" property. The index includes the graph component identifiers of the various components with the different indexed values for the "type" property. When a search operation is performed with criteria involving the "type" property, the search operation is automatically performed based on the index to quickly identify those graph components with particular values associated with the "type" property.

5. GOFS User Interface

According to various embodiments, GOFS 270 supports commands, via a user interface such as a graphical user interface, a command line interface, an API, etc., for search operations, filesystem management, permissions management, navigation operations, node handling operations, edge handling operations, metadata handling operations, etc.

5.1. Search Commands

GOFS 270 and/or application 210 is configured to perform a search operation over a graph represented by GOFS partition 300. Search operations may be based on any kind of search criteria, including any of: graph patterns, in-structure metadata values, and out-of-structure metadata values.

According to various embodiments, such a search operation is based, at least in part, on search criteria comprising both a particular node property associated with in-structure metadata values and a particular edge property associated with in-structure metadata values. For example, GOFS 270 receives a search operation command to find all nodes that represent mothers younger than 25 with at least one offspring that is at least 7 years old, where "age" is a node property associated with in-structure metadata values, "gender" is a node property associated with out-of-structure metadata values, and "type" is a relationship property with in-structure metadata values.

Performing the search operation comprises generating search operation results based, at least in part, on accessing in-structure metadata values for the particular node property and accessing in-structure metadata values for the particular edge property. If there is an index on the particular node property or an index on the particular edge property, the index can be used to access the in-structure metadata values for the indexed property. Furthermore, the in-structure metadata property values can be accessed within the graph component data structures themselves. At times, using an index to access in-structure metadata property values is more efficient than accessing the in-structure metadata property values within the graph component data structures. The determined search operation results are returned to a requesting entity.

When the search criteria of a search operation involve out-of-structure metadata values, generating search operation results can be performed based, at least in part, on accessing dedicated metadata storage 320 to retrieve the out-of-structure metadata values. As described in detail above, the out-of-structure metadata values may be indexed, and accessing the out-of-structure metadata values may be performed using the index.

To illustrate, the example search operation above is performed by the operating system, where an index is maintained on the in-structure metadata property values for the age of people represented by nodes. Accordingly, to perform the search operation, the operating system uses the index on the age node property to identify intermediate results for the query indicating all gnodes associated with age metadata values under 25.

The operating system uses the gnode identifiers in the intermediate results to determine which of the nodes are associated with "female" gender metadata values in dedicated metadata storage 320. For example, when a hash table is maintained in dedicated metadata storage 320 for out-of-structure node metadata values, the operating system uses the gnode identifiers in the intermediate results to identify buckets of the hash table storing data for each gnode. To identify out-of-structure metadata values for a particular gnode, the operating system traverses the list of gnode entries in the corresponding bucket to identify the gnode entry for the particular gnode. Once the gnode entry for the particular gnode is identified, the operating system determines whether the gender metadata property value in the hash table entry is "female", and if so, adds the gnode identifier to second intermediate results for the search operation.

Once all gnodes with "female" gender property values and with ages under 25 are identified in the second intermediate results, the operating system performs pattern matching on the graph data to identify which of the gnodes in the second intermediate results have a parent-type relationship with a gnode representing offspring that is over 7 years old. The in-structure metadata value search criteria are analyzed using in-structure metadata property values of the relationship "type" property and the node "age" property retrieved from the graph component data structures themselves.

5.1.1. Find Commands

GOFS 270 supports search operation commands, such as a find command, which cause the operating system to locate nodes in the represented graph based on provided search criteria. According to various embodiments, the find command automatically uses any applicable indices maintained within partition 300 for the search operation, and, if applicable, utilizes caches in cache data 240 (such as graph cache 246) or free space within partition 300 to store data for the search operation in order to efficiently execute the operation.

The following are example attributes and utilization examples of a find command, according to various embodiments. Specifically, GOFS 270 implements a find command, for a command line interface, that takes as an argument a search expression to identify one or more nodes and/or one or more relationships within the GOFS. According to various embodiments, the find command has the following pattern (where, in the description below, square brackets ([ ]) indicate an optional element, angle brackets (< >) indicate a mandatory element, and parenthesis represent grouping):

find search_pattern[options]

According to various embodiments, the find command supports the following:

Operators

| | |
|---|---|
| -a, && | and |
| -o, \|\| | or |
| == | Equal to |
| > | Greater than |
| >= | Greater or equal than |
| < | Lesser than |
| <= | Lesser or equal than |
| != | Different than |
| =~ | Regexp matching |

Notation for Edges/Relationships

An edge may be represented using a path, such as /v0/v1, which represents the edge pointing to v1 from v0. However, a file is also represented like this. Thus, according to various embodiments, identification of an edge is performed using a special operator or edge identifier, such as /v0->v1, v0>v1, or /v0:[edgeid], etc.

Find Options for Graph Node Searches (These find options may work with the help of both the Graph Cache 246 and Metadata Storage 320.)

| Option | Arguments | Functionality |
|---|---|---|
| nattr | None | Search nodes which have associated metadata values. |
| nattr_match | <operator match> [expr] where expr = expr operator \| operator value | This option returns the nodes which match the specified key/value criteria. Returns the nodes with the match names matching the operator criteria. If the optional arguments expr, which may be ([expr operator] or [operator value]) are specified, from the key matches, the values are matched also. Examples: nattr_match == "MainProgram": Returns all the nodes with this exact key match nattr_match != "MainProgram": Returns all the nodes which don't have this exact match nattr_match =~ "AutocadV*" > 2.0: |

-continued

| Option | Arguments | Functionality |
|---|---|---|
| | | Returns all the nodes, which key matches with the regular expression "AutocadV*" and have a value > 2.0.<br>nattr_match == "Weight" (>100 && <1000):<br>Return all nodes which key is a complete match with "Weight" and the value is >100 and <1000 |
| print_node | None | Print node name only, not edges |
| maxhops | <n> | Similar to the -maxdepth option. Don't skip more than n contiguous hops in the graph |
| minhops | <n> | Similar to the -mindepth option. Don't apply any tests or actions at hops lesser than n. |
| minpath | [destination_node_id] <distance_criteria> | Identify one or more minimum paths between the current node and the identified destination node. Default distance criteria is hops, but alternative criteria may be specified. If we take into consideration certain metadata values -which may represent distance, cost in money, traffic quantity, link speed or something else-, the Dijkstra's algorithm (and potentially other algorithms) may be used to identify the shortest path. |
| allpaths | [destination_node_id] | Identify all unique acyclic paths between the current node and the identified destination node. |

Find Options for Edge/Relationship Searches (May work with the help of both the Graph Cache 246 and Metadata Storage 320, or with Metadata Storage 320 only.)

| Option | Arguments | Functionality |
|---|---|---|
| eattr | <i> <o> | Search for edges in relationships with associated metadata values in in-structure metadata or in out-of-structure metadata. Optional additional arguments indicate whether in-structure metadata (-i) and/or out-of-structure metadata (-o) should be searched. |
| edge_find | [node_name/ identifier] <o> <t> | Identify all edges that originate at the identified node and/or that terminate at the identified node. Optional additional arguments indicate whether edges that originate at the identified node (-o) and/or edges that terminate at the identified node (-t) should be identified. |
| meta_find | None | Run a search in Metadata Storage 320 only. Find which nodes/edges match with the specified criteria. |
| print_edges | None | Print edges that match the criteria. |
| eattr_match | <operator match> [expr] where expr = expr operator \| operator value | This option returns the edges which match the specified key/value criteria.<br>Returns the edges with the match names matching the operator criteria. If the optional arguments expr, which may be ([expr operator] or [operator value]) are specified, from the key matches, the values are matched also.<br>Examples:<br>eattr_match == "TaxReport":<br>Returns all the edges with this exact key match.<br>eattr_match != "TaxReport":<br>Returns all the edges that don't have this exact matching.<br>eattr_match =~ "TaxReport" == 2021:<br>Returns all the edges, which key matches with the regular expression "TaxReport" and the value is 2021.<br>eattr_match == "Weight" (>100 && <1000) :<br>Return all nodes which key is a complete match with "Weight" and the value is >100 and <1000. |

The following examples are searches run over example graph 500 of FIG. 5A with weight metadata as indicated in gnode table 600 of FIG. 6. According to various embodiments, 'visited' flags for each gnode will be needed to perform the searches, in order to avoid visiting already-visited nodes. Notice that the GraphQL variant used in the examples employs a format such as (f)-[r], which indicates that the target operations are for (node)-[relationship].

EXAMPLES

| | |
|---|---|
| EXAMPLE1 | Traverse the nodes of graph 500, starting from the root gnode '/', and find the nodes which end with '.png' and also have attributes in metadata. Notice the -a option which is a logical 'and'. |
| Command | find / ( -name '*.png' -a -nattr ) |
| GraphQL corollary | Match /(f where f.name =~ "*.png") RETURN f |
| Returns | image.png |

-continued

| | |
|---|---|
| EXAMPLE2 | Traverse the nodes of graph 500, starting from /document.doc(V0), and find nodes which are associated with node metadata either in-structure or out-of-structure. |
| Command | find /document.doc -nattr<br>or<br>find /document.doc -nattr_match != " " |
| GraphQL corollary | Match /document.doc/(f where f.attr != " ") RETURN f |
| Returns | All the nodes in the graph |
| EXAMPLE3 | Starting from /, find the nodes which match with this string pattern '*.*o*', or are pdf documents |
| Command | Find / ( -name '*.*o*' -o -name '*.pdf' ) |
| GraphQL corollary | Match /(f where f.name =~ '*.*o*' \|\| f.name =~ '*.pdf')<br>return f |
| Returns | /image.png/music.mod<br>/document.doc<br>/candidate.pdf |
| EXAMPLE4 | Find all the nodes in /v3/v2 ( /image.png/music.mod ) which are within 1 hop of /image.png/music.mod |
| Command | find /image.png/music.mod -maxhops 1 |
| GraphQL corollary | Match /image.png/music.mod/( f within 1) |
| Returns | /image.png/music.mod<br>/image.png<br>/document.doc<br>/candidate.pdf |
| EXAMPLE5 | Find all the nodes farther than 1 hop from the root node "/". |
| Command | Find / -minhops 2 |
| GraphQL corollary | Match /(f outby 2) |
| Returns | /image.png/music.mod |
| EXAMPLE6 | Find all the nodes with the pattern '*.doc' in the name. Also, find the nodes with a key name like 'we*', starting from / |
| Command | Find / -name '*.doc' -a -nattr_match =~ "we" |
| GraphQL corollary | Match /(f where f.name =~ '*.doc' && f.attr =~ "we" ) |
| Returns | All the nodes in the graph |
| EXAMPLE7 | Find all the nodes with an "age" attribute greater than or equal to 500 and lesser than 1000, starting from the root node "/"., assuming that the nodes are associated, such as in metadata storage 320 or in in-structure metadata, with the following age-type metadata values: V0[age] = 200; V1[age] = 400; V2[age] = 600; V3[age] = 800; and V4[age] = 1000. |
| Command | Find / ( -nattr_match == "weight"( >= 500 && < 1000) |
| GraphQL corollary | Match /( f where f.attr "weight" ( >= 500 && < 1000)) |
| Returns | /image.png/music.mod<br>/image.png |
| EXAMPLE8 | Find all the relations of the node /image.png/music.mod |
| Command | Find /image.png/music.mod -edge find |
| GraphQL corollary | Match ( /image.png/music.mod ) - [r] return r |
| Returns | /image.png/music.mod−>document.doc<br>/image.png/music.mod−>image.png<br>/image.png/music.mod−>candidate.pdf |
| EXAMPLE9 | Starting from /, find the edges originating at nodes with names that match the string pattern '*.*o*', or that are pdf documents, where the edges are associated with metadata. |
| Command | Find / ( -name '*.*o*' -o -name '*.pdf' ) -a -eattr |
| GraphQL corollary | Match /(f where f.name =~ '*.*o*' \|\| f.name =~ '*.pdf') -[r where r.attr != " " ] return r |
| Returns | /image.png/music.mod−>document.doc<br>/image.png/music.mod−>image.png<br>/image.png/music.mod−>candidate.pdf<br>/document.doc−>candidate.pdf<br>/document.doc−>music.mod<br>/document.doc−>image.png<br>/document.doc−>video.mpeg<br>/candidate.pdf−>document.doc<br>/candidate.pdf−>video.mpeg<br>/candidate.pdf−>music.mod |
| EXAMPLE10 | Find all nodes from /, which edges with relationship metadata with a key like the string "wei". |
| Command | Find / -eattr_match =~ "wei" -print_node |
| GraphQL corollary | Match /(f) - [ r where r.attr =~ "wei" ] return f |
| Returns | All the nodes in graph 500. Notice that the result does not include edges, just node names. |
| EXAMPLE11 | Print all the node/edges with a weight attribute value greater than or equal to 500 and less than 700, starting from /. |
| Command | Find / ( -eattr_match == "weight" ( >= 500 && < 700)) |
| GraphQL corollary | Match /( f ) - [r where r.attr == "weight" ( >= 500 && < 700) ] return r |
| Returns | /candidate.pdf−>video.mpeg<br>/image.png−>video.mpeg<br>/−>image.png |

| | -continued |
|---|---|
| EXAMPLE12 | Print the shortest path(s) between / and V2 based on the number of hops. |
| Command | Find / ( -minpath V2__) |
| GraphQL corollary | Match shortest (/->/v3/v2) as p return p |
| Returns | /document.doc->music.mod |
| | /candidate.pdf->music.mod |
| | /image.png->music.mod |
| EXAMPLE13 | Print the shortest path(s) between / and V2 based on the metadata values for the "weight" key associated with the edges (either in-structure or out-of-structure), calculated based on the in-structure metadata values depicted in gnode table 600 of FIG. 6. |
| Command | Find / ( -minpath V2"__"weight") |
| GraphQL corollary | Match shortest (/-["weight"]->/v3/v2) as p return p |
| Returns | /document.doc->music.mod |
| EXAMPLE14 | Print all path(s) between / and V2. |
| Command | Find / ( -allpaths V2__) |
| GraphQL corollary | Match all (/->/v3/v2) as p return p |
| Returns | /document.doc->music.mod |
| | /document.doc->candidate.pdf->music.mod |
| | /document.doc->image.png->music.mod |
| | /candidate.pdf->music.mod |
| | /candidate.pdf->document.doc->music.mod |
| | /image.png->music.mod |
| | /image.png->document.doc->music.mod |

5.1.2. Visited Flags

According to various embodiments, one or both of the gnode data structures and edge data structures store one or more "visited" flags that may be used during performance of a search operation. For example, gnodes include respective arrays of bits for "visited" flags (called herein "visited[ ]"). In connection with performing a particular search operation that requires graph pattern matching, the operating system determines that visited[2] is not currently in use for a search operation and reserves visited[2] for the particular search operation. When a particular node has been evaluated to determine whether the node satisfies the graph pattern of the particular search operation (i.e., the node has been "visited"), the bit at visited[2] is set to a first value (e.g., '1'). During further traversal of the graph for the particular search operation, the value of visited[2] may be used to determine whether the node has been previously visited and avoid unnecessarily revisiting the node, which eliminates duplication of work to perform the search operation.

According to an embodiment, once the particular search operation is complete, the operating system automatically sets all bits at visited[2] of all gnode data structures to a second value (e.g., '0') and marks visited[2] as not currently in use for a search operation. Thus, visited[2] is made available for use by a subsequent search operation. Edge entry "visited" flags may be used in a manner similar to the gnode "visited" flags, as described in the above example, to track which edges or relationships have been "visited" for a given search operation.

5.2. Filesystem Management Commands

GOFS 270 supports filesystem management commands including the following commands, represented by commands for a command line interface (where an example of the gnode table is gnode table 350 (FIG. 3) and an example of metadata as used below is dedicated metadata space 320 (FIG. 3) and/or the in-structure metadata field in node fields 403 (FIG. 4)):

fstat: show GOFS statistics and number of gnodes in graph data, number of edges in graph data, and number of free slots in gnode table.

dumpgnodes: [debug] dump all gnodes.
dumpslots: [debug] dump metadata used slots in gnode table.
dumpino: [debug] dump gnodes data in both gnode table and metadata.
dumpedges: [debug] given a gnode, dump edges in metadata.
gnodes: show listing of all gnode identifiers for the file system.

Permissions Management Commands

GOFS 270 supports permission management commands including the following commands, represented by commands for a command line interface:

chperms/chmod: change gnode permissions [rightmost 24 bits in the gnode:mode field].
chino: change gnode fields permissions [bits 18-23 in the gnode:mode field].
chedge: change gnode edge permissions [bits 9-17 in the gnode:mode field].
chdata: change gnode data permissions [bits 0-8 in the gnode:mode field].
chown: change gnode owner, gnode:uid field.
chgrp: change gnode group, gnode:gid field.
access: given a gnode, verify if an indicated access type is possible for the current user.

5.3. Navigation Commands

GOFS 270 supports navigation commands including the following commands, represented by commands for a command line interface:

ls: Shows a list of traversable edges at the current node. According to various embodiments, edges may be represented in any way, such as using a special symbol and the name of the destination node. To illustrate, in the context of graph 500 (FIG. 5A), a user navigates to V1 and invokes the ls command. The following results are displayed indicating the traversable edges originating at V1, where the special edge symbol is ->:
->V0
->V2
->V4 lsedges: Shows a list of all edges (other than OS_hidden edges) at the current node.
cd: Go to the node identified by the specified pathname.
pwd: Get the absolute pathname for the current working node.
graph: Show all nodes in the file system, similar to "tree" utility in Linux.

5.4. Node Handling Commands

GOFS 270 supports node handling commands including the following commands, represented by commands for a command line interface:

mknod/touch: Creates a new node with a relationship to the current working node.
store: Add data to the current working node or to a target node.
stat: Provides information about the current working node or a target node.
cat: Dump content data of the current working node or a target node.
mv: Move an identified node to a specified location identified by a particular destination node identifier by deleting all existing relationships involving the identified node and establishing a new relationships between the identified node and the particular destination node.
mvow: Overwrites a destination node with a source node by: removing all relationships that involve the source node, making a new relationship between the source node and any node with which the destination node had a relationship (there is an option to port any metadata from the old relationships to the corresponding new relationships), and deleting the destination node.
cp: Makes a copy of a source node with all existing relationships and establishes a new relationship between the copy and a destination node.
cpow: Overwrites a destination node with a copy of a source node by: copying the source node (potentially with the existing relationship information), making a new relationship between the copy of the source node and any node with which the destination node had a relationship (there is an option to apply any metadata from the existing relationships to the corresponding new relationships), and deleting the destination node.
rm: Deletes a target node and all relationships with the target node.
rename: Renames a target node identified by a specified path (only updates the specified edge entry).
chroot: Change the root node to the current working node or to a target node. According to various embodiments, the chroot command has effect in the current process only, and does not affect the whole system or other users and processes. This means, if a user issues a chroot, it will only affect the user's own processes. Thus, the chroot command may have application in a container context. For example, a container application runs a chroot command upon initiation, and the container and its child processes thereafter run confined to the identified part of the filesystem space.
chrootsys: Causes the root gnode for the system to be changed, as described in detail above.
isolate: Make a set of identified relationships, originating at the current working node, one-directional by marking the edge entries at the current working node, for the identified relationships, as hidden (e.g., by setting a user-initiated hidden flag for each of the edge entries).
nodesetflags: Set/unset the bit of an identified flag for an identified node.

5.5. Edge Handling Commands

GOFS 270 supports edge handling commands including the following commands, represented by commands for a command line interface:

mkrelat/link: Create a relationship between a specified pair of nodes.
rmrelat/unlink: Delete a relationship between a specified pair of nodes. If execution of this command results in a disconnected node, the disconnected node is handled as described herein.
edgesetflags: Set/unset the bit of an identified flag for an identified edge entry.

According to various embodiments, an edge is identified by identifying a source node and a destination node for the edge. Further, a relationship is identified by identifying the two nodes that are related by the relationship.

5.6. Metadata Handling Commands

According to various embodiments, out-of-structure metadata values of a graph component are stored as key-value pairs in dedicated metadata storage 320 and/or in-structure metadata values are stored in data structures for the graph components themselves. GOFS 270 supports metadata handling commands including the following commands, represented by commands for a command line interface:

lsattr [superblock|node|relat]: list all the key-value pairs assigned to superblock, a specific gnode, or relationship.
setattr [superblock|node|relat]key=value: set a key-value pairs to superblock, a specific gnode, or relationship.
getattr [superblock|node|relat]key: given a key, retrieve a value from the superblock, a specific gnode, or relationship.
rmattr [superblock|node|relat]key: given a key, remove a value from the superblock, a specific gnode, or relationship.
clnattr [superblock|node|relat]: clean all the key-value pairs assigned to superblock, a specific gnode, or relationship.
searchattr [key operator value]: simple search of keys and key-value pairs in the metadata storage. The possible nodes or relationships matching will be displayed depending on user permissions, invisibility flags and things like that.

According to various embodiments, metadata handling commands are applied to out-of-structure metadata values or to in-structure metadata values based on an option for each command. According to various embodiments, separate metadata handling commands are provided for handling out-of-structure metadata values and for handling in-structure metadata values.

Furthermore, according to various embodiments, the various commands for editing metadata (e.g., identified above) are associated with aliases for operation over the superblock, a node, and a relationship. For example, lsattr is associated with the aliases lsattrsuper, lsattrnode, and lsattrrelat, which operate over the superblock, a node, and a relationship, respectively.

5.6.1. Using ". ." In Pathnames

A traditional directory entry list for an inode in a hierarchically-organized file system generally includes a "." entry pointing to the inode itself and a ".." entry pointing to the parent directory of the inode. However, a graph does not have the imposed directionality of hierarchically-organized file systems, which eliminates the idea of "parent" nodes in many cases. Thus, according to various embodiments, in GOFS 270, an edge entry list for a gnode includes a "." entry pointing to the gnode itself and omits a ".." entry.

According to various embodiments, a user may utilize ".." in pathnames for file system commands, where interpretation of ".." in a command is handled by the operating system, e.g., at file system command interface 260. The way that ".." is handled may be directed by user configuration information, which may direct the operating system to interpret ".." as a reference to a node that is the destination of the outgoing edge with the greatest or least value for a particular edge property (such as weight), or as a reference to the penultimate-path node (which is the node, identified in the pathname used to navigate to the current working node, that was identified directly before the current working node in the pathname or, in the absence of a pathname with a penultimate node, is the node that was the working node directly before the current working node), etc.

For example, in the context of graph 500 of FIG. 5A, a user navigates from V0 (the current working node) to V2 using the command "cd ./v1/v2". The penultimate-path node in this case is V1 because it is the node, identified in the pathname used to navigate to V2, that was identified directly before the V2 in the pathname. After using this command to navigate to V2, the user issues the command "cd ..". When the user configuration requires the penultimate-path interpretation of "..", this command results in the operating system navigating to V1.

As another example, a user navigates from V0 (the current working node) to V1 using the command "cd v1". There is no penultimate-path node in this case. Thus, if after using this command to navigate to V1, the user issues the command "cd ..", the operating system interprets ".." to mean the previous working node, or V0. For example, the operating system maintains, for all running processes, a current working node (similar to a "current working directory", cwd) that indicates the current location in the graph data for each running process. Thus, if a process issues a command that involves "..", such as 'cd ..' or 'cd ../../home', the operating system uses the current working node value maintained for the process in conjunction with the data returned by file system edge entries retrieved by the process get the absolute location of the process.

5.7. Property Labels

According to various embodiments, GOFS 270 provides a user interface that allows a user to define sets of graph component properties associated with unique user-defined labels. The user may then apply a label to a particular graph component, which causes GOFS 270 to include, in the metadata for the graph component, with all properties that are associated with the applied label. According to various embodiments, upon a user applying a label to a graph component, GOFS 270 solicits values for the properties of the label to include in metadata for the graph component. The user may indicate via the user interface whether a particular property metadata value should be stored in-structure or out-of-structure.

Thus, all graph components associated with the same label will have the same properties associated therewith. This reduces unintentional omission of particular graph components from search results based on accidental metadata property omission. Further, the use of labels associated with sets of graph component properties reduces user error in setting up metadata values, including typographical errors in property names.

FIG. 8 depicts an example graphical user interface (GUI) 800 that allows a user to define labels for graph components and associate those labels with properties for graph component metadata. Each property is given a name, a data type, and the user indicates whether the value should be stored in-structure. In this example, the user defines a label "thesis version", and defines a set of properties to be associated with the label. The user includes, in the set of properties for "thesis version" nodes, the following properties: "version number" (integer), "section" (string), "final" (boolean), and "redline completed" (boolean). The "version number" property values are to be stored in-structure in the gnodes for nodes with this label. When the user creates a new node in the represented graph, the user is presented with a list of defined labels that may be associated with the created node. When the user associates the new node with the label "thesis version", GOFS 270 automatically creates metadata, for the node, with the properties defined for the label. The created metadata may have default or blank metadata values, or the user may provide values for the metadata properties in connection with applying the label to the node.

6. Application Examples

Figure 9:
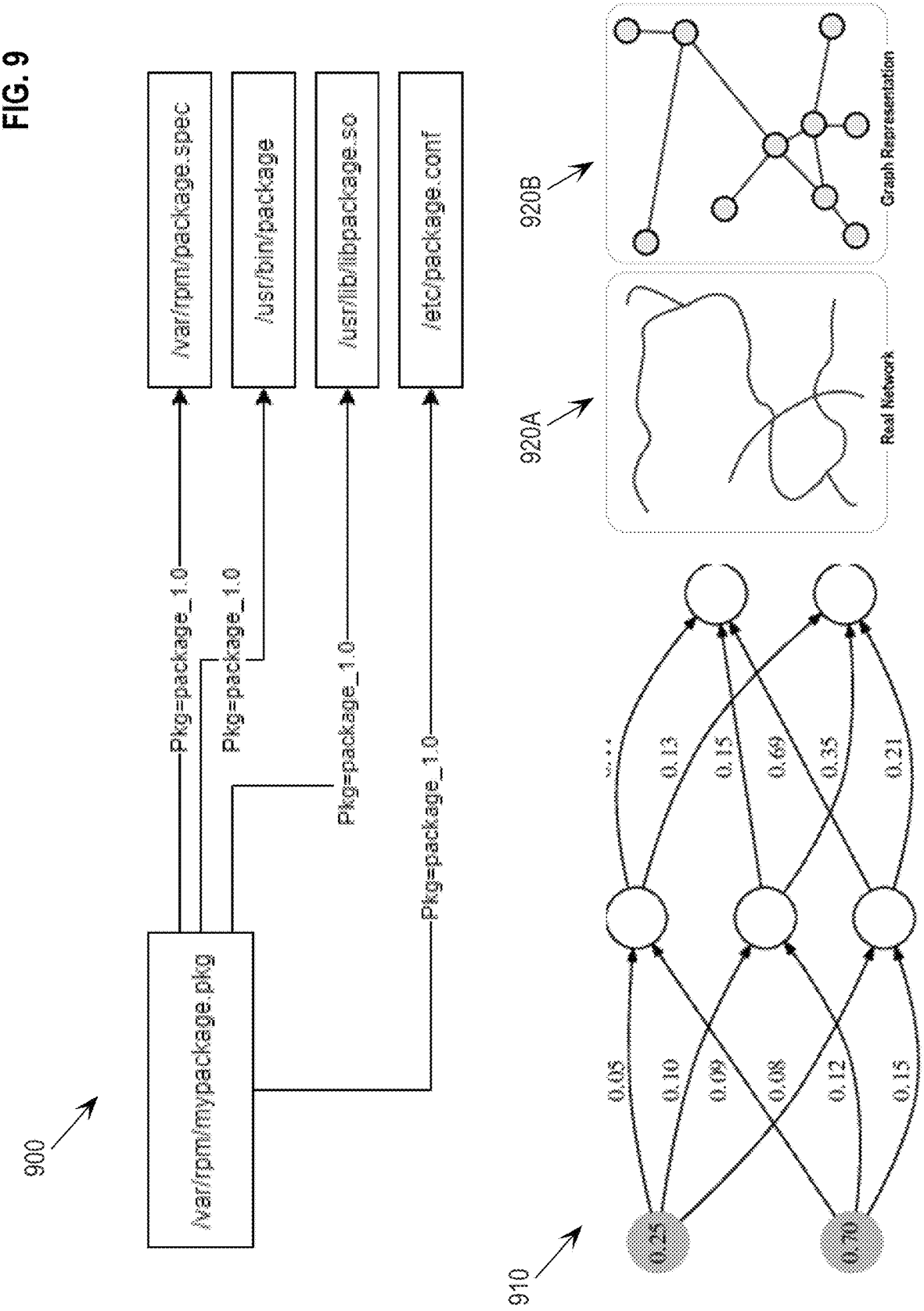
FIG. 9 depicts examples of graph-amenable data.

There are multiple application types that would benefit from storing information as graph data on the file system level. In general, applications for which data is generally scattered in multiple files would get a performance boost by using a GOFS file system. More specifically, these kinds of applications can potentially get a speed boost in I/O operations when stored and accessed using GOFS, which efficiencies may arise because the graph functionality is implemented by the operating system and not by additional software, and/or because the data is stored in a format that is more natural to the data resulting in more efficient access and search. These application types include, but are not limited to:

- Artificial Intelligence
- Geographic data
- Social networking, including food delivery, taxi apps, recruitment, for both storage and caches in mobile devices.
- Software development
- Government security agencies
- Banking
- Media production
- Databases
- Embedded applications
- Massive/distributed storage solutions in cloud To illustrate, software developers would have extra capabilities for storage using GOFS. FIG. 9 depicts examples of graph-amenable data that includes an example graph 900 representing the components of a software package with one-directional relationships. Each relationship is associated with metadata (e.g., in-structure metadata) with the following key name and value "PKG=package_1.0". Information in the metadata may be used by the developers to identify relationships associated with the value "package_1.0", e.g., using a search operation that uses search criteria that identifies the metadata value. A GOFS can be queried using queries that are in GraphQL or in a language similar to GraphQL, according to various embodiments. For example, the following graph query may be used to retrieve information from graph 900 maintained by a GOFS to identify nodes that match a particular graph query pattern and return particular needed information for the matching nodes, as follows:

```
match ( "/var/rpm/mypackage.pkg" ) ->[ Relat.Pkg =
"package_1.0" ] return Relat.long_entry
/var/rpm/package.spec
/usr/bin/package
/usr/lib/libpackage.so
/etc/package.conf
```

As a further example, many artificial intelligence (AI)-based applications use neural networks to solve problems in different fields, including classification, pattern and sequence recognition, predictions, simulations, analysis, modeling, decision making, data processing, function approximation, etc. Neural networks are representable as a weighted graph structure, with layers of nodes, as depicted by example graph 910 of FIG. 9. This specific feature of neural networks makes a GOFS a natural option for storage, potentially resulting in more efficient access and search of the data within GOFS.

As yet another example, a geographic graph data represents geographical locations using a graph, which may be weighted to show distances. FIG. 9 further depicts an example graph 920B that models a road network 920A using the depicted nodes and relationships, with relationship lengths representing relationship weights (i.e., distances) associated with the various relationships. The nodes in graph 920B correspond to intersections and the relationships to the roads connecting them.

7. Hardware Overview

An application, such as application 210 runs on a computing system and comprises a combination of software and allocation of resources from the computing system. Specifically, an application is a combination of integrated software components and an allocation of computational resources, such as memory, and/or processes on the computing system for executing the integrated software components on a processor, the combination of the software and computational resources being dedicated to performing the stated functions of the application.

One or more of the functions attributed to any process described herein, may be performed any other logical entity that may or may not be depicted in FIG. 4, according to one or more embodiments. In some embodiments, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
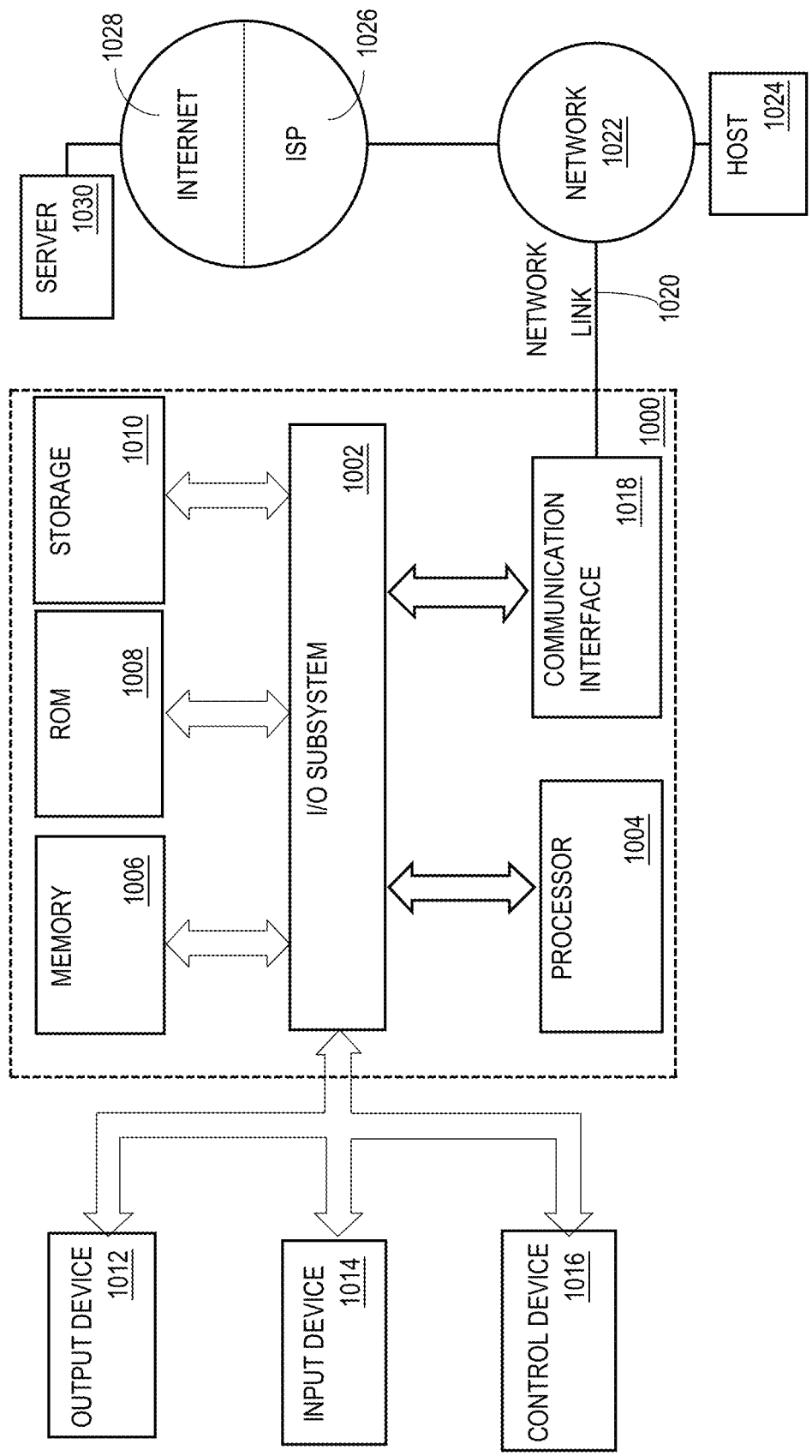
FIG. 10 is a block diagram that illustrates a computer system upon which an embodiment may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general-purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world-wide packet data communication network now commonly referred to as the "Internet" 1028. Local network 1022 and Internet 1028 both use electrical, electromagnetic, or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

8. Software Overview

Figure 11:
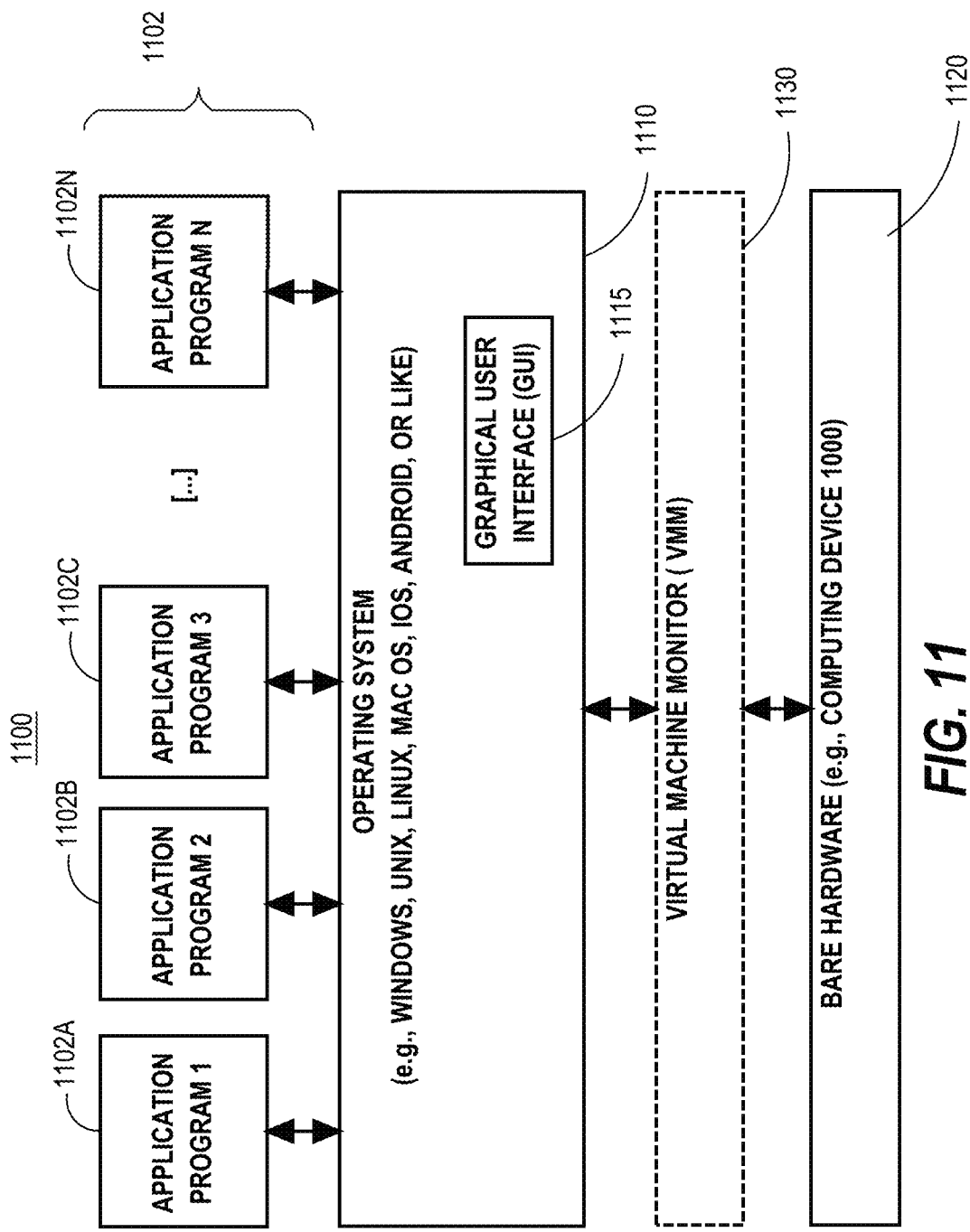
FIG. 11 is a block diagram of an example basic software system that may be employed for controlling the operation of a computer system.

FIG. 11 is a block diagram of a basic software system 1100 that may be employed for controlling the operation of computer system 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computer system 1000. Software system 1100, which may be stored in system memory (RAM) 1006 and on fixed storage (e.g., hard disk or flash memory) 1010, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 1010 into memory 1006) for execution by the system 1100. The applications or other software intended for use on computer system 1000 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off). While FIG. 11 depicts GUI 1115 as being included in the operating system 1110, a GUI provided by the operating system may be provided in a manner similar to application programs 1102A-N, i.e., as a process in the user space.

OS 1110 can execute directly on the bare hardware 1120 (e.g., processor(s) 1004) of computer system 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the computer system 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1000 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

9. Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   maintaining a graph-organized file system (GOFS) in a kernel space, the GOFS comprising (a) a plurality of node data structures representing a plurality of nodes, each node data structure of the plurality of node data structures representing a file or a directory in a file system implemented by an operating system of one or more computing devices and storing an in-structure metadata value of a particular node property and (b) a plurality of edge entry data structures representing a set of one or more relationships between nodes of the plurality of nodes, each edge entry data structure of the plurality of edge entry data structures storing an in-structure metadata value of a particular edge property, wherein the plurality of node data structures and the plurality of edge data structures for the GOFS are stored in a GOFS partition, in persistent storage accessible by a particular computing device of the one or more computing devices;
   performing a search operation over a graph represented by the GOFS based, at least in part, on search criteria comprising one or more of the particular node property or the particular edge property;
   wherein said performing the search operation comprises generating search operation results based, at least in part, on one or more of:

accessing in-structure metadata values for the particular node property, or accessing in-structure metadata values for the particular edge property; and returning the search operation results.

2. The computer-executed method of claim 1, further comprising:

maintaining an index on one or more graph component properties corresponding to one or more of a set of in-structure metadata values comprising: (a) the in-structure metadata values for the particular node property, and (b) the in-structure metadata values for the particular edge property;

wherein said accessing one or more in-structure metadata values of the set of in-structure metadata values comprises accessing the one or more in-structure metadata values in the index.

3. The computer-executed method of claim 1, wherein:

a set of in-structure metadata values comprises: (a) the in-structure metadata values for the particular node property, and (b) the in-structure metadata values for the particular edge property;

said accessing one or more in-structure metadata values of the set of in-structure metadata values comprises accessing the one or more in-structure metadata values in graph component data structures comprising one or both of the plurality of node data structures and the plurality of edge data structures.

4. The computer-executed method of claim 1, wherein:

the GOFS comprises a dedicated metadata space, in a file system partition in persistent storage, comprising a plurality of data blocks;

the dedicated metadata space stores out-of-structure metadata values for graph components of the graph; and the graph components of the graph comprise the plurality of nodes and the set of one or more relationships.

5. The computer-executed method of claim 4, wherein the out-of-structure metadata values are stored in key-value pairs.

6. The computer-executed method of claim 4, wherein:

the search criteria further comprise an out-of-structure node metadata value for a second node property; and said generating search operation results is further based, at least in part, on accessing the dedicated metadata space to retrieve the out-of-structure node metadata value for one or more nodes of the plurality of nodes based, at least in part, on one or more identifiers of the one or more nodes.

7. The computer-executed method of claim 4, wherein:

the search criteria further comprise an out-of-structure relationship metadata value for a particular relationship property; and said generating search operation results is further based, at least in part, on accessing the dedicated metadata space to retrieve the out-of-structure relationship metadata value for one or more relationships of the set of one or more relationships based, at least in part, on one or more identifiers of the one or more relationships.

8. The computer-executed method of claim 4, further comprising:

maintaining, in the partition, an index on one or more graph component properties corresponding to one or more out-of-structure metadata values for graph components of the graph;

wherein the search criteria refer to at least one of the one or more graph component properties corresponding to the one or more out-of-structure metadata values; and wherein said performing the search operation over the graph comprises using the index.

9. The computer-executed method of claim 4, wherein:

the dedicated metadata space stores one or more out-of-structure metadata values for a superblock of the partition; and the method further comprises accessing the dedicated metadata space to retrieve the one or more out-of-structure metadata values for the superblock based, at least in part, on a reserved superblock value identifying the superblock within the dedicated metadata space.

10. The computer-executed method of claim 1, wherein:

the search criteria further comprise a graph node pattern; and said performing the search operation comprises performing pattern matching based on the graph node pattern.

11. The computer-executed method of claim 1, wherein:

each node data structure of the plurality of node data structures comprises a visited flag;

said performing the search operation over the graph comprises tracking visited nodes using the visited flags of the plurality of node data structures.

12. The computer-executed method of claim 1, wherein:

each edge entry data structure of the plurality of edge entry data structures comprises a visited flag;

said performing the search operation over the graph comprises tracking visited edges using the visited flags of the plurality of edge entry data structures.

13. The computer-executed method of claim 1, wherein the search operation identifies one of: one or more shortest paths between identified nodes, or all paths between identified nodes.

14. One or more non-transitory computer-readable media storing one or more sequences of instructions that, when executed by one or more processors, cause:

maintaining a graph-organized file system (GOFS) in a kernel space, the GOFS comprising (a) a plurality of node data structures representing a plurality of nodes, each node data structure of the plurality of node data structures representing a file or a directory in a file system implemented by an operating system of one or more computing devices and storing an in-structure metadata value of a particular node property and (b) a plurality of edge entry data structures representing a set of one or more relationships between nodes of the plurality of nodes, each edge entry data structure of the plurality of edge entry data structures storing an in-structure metadata value of a particular edge property, wherein the plurality of node data structures and the plurality of edge data structures for the GOFS are stored in a GOFS partition, in persistent storage accessible by a particular computing device of the one or more computing devices;

performing a search operation over a graph represented by the GOFS based, at least in part, on search criteria comprising one or more of the particular node property or the particular edge property;

wherein said performing the search operation comprises generating search operation results based, at least in part, on one or more of:

accessing in-structure metadata values for the particular node property, or accessing in-structure metadata values for the particular edge property; and returning the search operation results.

15. The one or more non-transitory computer-readable media of claim 14, wherein the one or more sequences of instructions further comprise instructions that, when executed by one or more processors, cause:
 maintaining an index on one or more graph component properties corresponding to one or more of a set of in-structure metadata values comprising: (a) the in-structure metadata values for the particular node property, and (b) the in-structure metadata values for the particular edge property;
 wherein said accessing one or more in-structure metadata values of the set of in-structure metadata values comprises accessing the one or more in-structure metadata values in the index.

16. The one or more non-transitory computer-readable media of claim 14, wherein:
 a set of in-structure metadata values comprises: (a) the in-structure metadata values for the particular node property, and (b) the in-structure metadata values for the particular edge property;
 said accessing one or more in-structure metadata values of the set of in-structure metadata values comprises accessing the one or more in-structure metadata values in graph component data structures comprising one or both of the plurality of node data structures and the plurality of edge data structures.

17. The one or more non-transitory computer-readable media of claim 14, wherein:
 the GOFS comprises a dedicated metadata space, in a file system partition in persistent storage, comprising a plurality of data blocks;
 the dedicated metadata space stores out-of-structure metadata values for graph components of the graph; and
 the graph components of the graph comprise the plurality of nodes and the set of one or more relationships.

18. The one or more non-transitory computer-readable media of claim 17, wherein the out-of-structure metadata values are stored in key-value pairs.

19. The one or more non-transitory computer-readable media of claim 17, wherein:
 the search criteria further comprise an out-of-structure node metadata value for a second node property; and
 said generating search operation results is further based, at least in part, on accessing the dedicated metadata space to retrieve the out-of-structure node metadata value for one or more nodes of the plurality of nodes based, at least in part, on one or more identifiers of the one or more nodes.

\* \* \* \* \*

UNITED STATES PATENT AND TRADEMARK OFFICE
CERTIFICATE OF CORRECTION

| | |
|---|---|
| PATENT NO. | : 12,204,494 B2 |
| APPLICATION NO. | : 17/719555 |
| DATED | : January 21, 2025 |
| INVENTOR(S) | : Garduno Hernandez |

Page 1 of 1

It is certified that error appears in the above-identified patent and that said Letters Patent is hereby corrected as shown below:

In the Specification

In Column 27, Line 25, delete "./v1/v2"." and insert -- ./V1/V2". --, therefor.

In Column 27, Line 34, delete "v1"." and insert -- V1". --, therefor.

Signed and Sealed this
Eighth Day of April, 2025

Coke Morgan Stewart
*Acting Director of the United States Patent and Trademark Office*